US012764614B2

(12) United States Patent
Jung et al.

(10) Patent No.: US 12,764,614 B2
(45) Date of Patent: Oct. 13, 2026

(54) METHOD AND APPARATUS FOR INTER-CENTRAL UNIT (CU) HANDOVER OF INTEGRATED ACCESS AND BACKHAUL (IAB) NODE IN WIRELESS COMMUNICATION SYSTEM

(71) Applicants: Samsung Electronics Co., Ltd., Suwon-si (KR); Seoul National University R&DB Foundation, Seoul (KR)

(72) Inventors: Byounghoon Jung, Suwon-si (KR); Saewoong Bahk, Seoul (KR); Kitaek Lee, Seoul (KR); Seungwoo Baek, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 18/696,496

(22) PCT Filed: Sep. 29, 2022

(86) PCT No.: PCT/KR2022/014645
§ 371 (c)(1),
(2) Date: Mar. 28, 2024

(87) PCT Pub. No.: WO2023/055118
PCT Pub. Date: Apr. 6, 2023

(65) Prior Publication Data

US 2024/0388975 A1 Nov. 21, 2024

(30) Foreign Application Priority Data

Sep. 29, 2021 (KR) ........................ 10-2021-0128953

(51) Int. Cl.
*H04W 36/00* (2009.01)
*H04W 76/19* (2018.01)

(52) U.S. Cl.
CPC ....... *H04W 36/0058* (2018.08); *H04W 76/19* (2018.02)

(58) Field of Classification Search
CPC ............. H04W 36/0085; H04W 24/04; H04W 36/00837; H04W 36/305; H04W 48/14; H04W 36/0016
See application file for complete search history.

(56) References Cited

U.S. PATENT DOCUMENTS 9,510,263 B2 11/2016 Pan et al.
11,991,578 B2 * 5/2024 Hasegawa ............. H04W 16/26
(Continued)

FOREIGN PATENT DOCUMENTS

KR 10-2019-0127561 A 11/2019

OTHER PUBLICATIONS

3GPP TR 38.874 V16.0.0 (Dec. 2018) (Year: 2018).*
(Continued)

*Primary Examiner* — Dung Hong
(74) *Attorney, Agent, or Firm* — Jefferson IP Law, LLP

(57) ABSTRACT

The present disclosure relates to a communication system for supporting a high data transfer rate. An embodiment of the present disclosure provides a method, performed by a first gNodeB (gNB)-central unit (CU), of supporting an integrated access and backhaul (IAB) node in performing handover to a second gNB-CU in a wireless communication system. The method includes transmitting handover information to at least one lower node connected to the IAB node, the handover information being determined based on a measurement report for handover of the IAB node, transmitting a handover request message including the handover information of the IAB node to the second gNB-CU, receiving context information from the at least one lower node, based on the context information, identifying, as a first class,
(Continued)

a lower node to perform intra-CU handover, and identifying, as a second class, a lower node to perform inter-CU handover from among the at least one lower node, supporting intra-CU handover of the lower node identified as the first class, and supporting inter-CU handover of the IAB node to the second gNB-CU, based on the handover information of the IAB node and a handover acceptance message of the IAB node which is received from the second gNB-CU.

14 Claims, 19 Drawing Sheets

(56) References Cited

U.S. PATENT DOCUMENTS

| | | | | |
|---|---|---|---|---|
| 2017/0311216 | A1 | 10/2017 | Mythri Hunukumbure et al. | |
| 2020/0351729 | A1 | 11/2020 | Rastegardoost et al. | |
| 2021/0051547 | A1* | 2/2021 | Koskinen | H04W 36/087 |
| 2021/0160735 | A1* | 5/2021 | Fujishiro | H04B 7/15528 |
| 2021/0219368 | A1* | 7/2021 | Fujishiro | H04W 76/27 |
| 2021/0227435 | A1* | 7/2021 | Hsieh | H04W 36/087 |
| 2021/0360496 | A1* | 11/2021 | Ishii | H04W 36/0061 |
| 2022/0132381 | A1* | 4/2022 | Novlan | H04W 36/0016 |
| 2022/0182905 | A1* | 6/2022 | Xu | H04W 36/302 |
| 2022/0232452 | A1* | 7/2022 | Sivaraj | H04W 8/26 |
| 2023/0072977 | A1* | 3/2023 | Fujishiro | H04W 36/0009 |
| 2023/0232294 | A1* | 7/2023 | Teyeb | H04W 36/0235 370/331 |
| 2023/0239754 | A1* | 7/2023 | Barac | H04W 36/0009 370/331 |
| 2023/0247495 | A1* | 8/2023 | Teyeb | H04W 36/0072 370/331 |
| 2023/0269630 | A1* | 8/2023 | Teyeb | H04W 36/0016 370/331 |
| 2023/0328604 | A1* | 10/2023 | Teyeb | H04W 36/0235 370/331 |

OTHER PUBLICATIONS

Nokia, Summary of Offline Discussion on Reduction of Service Interruption reduction, R3-206856, 3GPP TSG-RAN WG3 #110-e, Online, Nov. 2-12, 2020.
Huawei, Inter-donor-CU handover procedure analysis, R3-205292, 3GPP TSG-RAN WG3 meeting #109-e, Online, Aug. 17-28, 2020.
Qualcomm, CB#11 IABInterDonorMigration, R3-206854, 3GPP TSG-RAN WG3 #112-e, Online, Nov. 2-13, 2020.
Samsung, TP for SON BLCR for 38.423: Support for MRO of CHO, R3-206022, 3GPP TSG-RAN3 Meeting #110-e, E-Meeting, Nov. 2-12, 2020.
Qualcomm Incorporated, Email discussion summary for RAN4#94e_#82_NR_IAB_RF_Tx, R4-2002511, 3GPP TSG-RAN WG4 Meeting #94-e, Electronic Meeting, Feb. 24-Mar. 6, 2020.
3rd Generation Partnership Project; Technical Specification Group Radio Access Network; NR; Study on Integrated Access and Backhaul; (Release 16), 3GPP TR 38.874 V16.0.0 (Dec. 2018), Jan. 10, 2019.
CATT, Inter-Donor IAB Node Migration (Procedure Details), R3-213326, 3GPP TSG-RAN3 #113-e, E-meeting, Aug. 6, 2021.
Fujitsu, Discussion on IAB full migration, R3-213486, 3GPP TSG-RAN WG3 Meeting #113 electronic, Online, Aug. 6, 2021.
Samsung, (TP for IAB BL CR TS38.401) Discussion on inter-donor IAB node migration procedure for Rel-17 eIAB, R3-213313, 3GPP TSG-RAN WG3 Meeting #113-e, Aug. 6, 2021.
International Search Report dated Jan. 18, 2023, issued in International Application No. PCT/KR2022/014645.

* cited by examiner

METHOD AND APPARATUS FOR INTER-CENTRAL UNIT (CU) HANDOVER OF INTEGRATED ACCESS AND BACKHAUL (IAB) NODE IN WIRELESS COMMUNICATION SYSTEM

TECHNICAL FIELD

The present disclosure relates to a wireless communication system, and to a method and apparatus for inter-central unit (CU) handover of an integrated access and backhaul (IAB) node.

BACKGROUND ART

Considering the development of wireless communication from generation to generation, technologies have been developed mainly for services targeting humans, such as voice calls, multimedia services, data services, and the like. Following the commercialization of 5$^{th}$ generation (5G) communication systems, it is expected that connected devices that have been exponentially growing will be connected to communication networks. Examples of things connected to networks may include vehicles, robots, drones, home appliances, displays, smart sensors installed in various infrastructures, construction machines, factory equipment, and the like. Mobile devices are expected to evolve in various form-factors such as augmented reality glasses, virtual reality headsets, hologram devices, and the like. In order to provide various services by connecting hundreds of billions of devices and things in the 6$^{th}$ generation (6G) era, there have been ongoing efforts to develop enhanced 6G communication systems. For these reasons, 6G communication systems are referred to as beyond-5G systems.

6G communication systems, which are expected to be commercialized around 2030, will have a peak data rate of tera (i.e., 1,000 giga)-level bps and radio latency less than 100 μsec. That is, the 6G communication systems will be 50 times as fast as 5G communication systems and have one tenth the radio latency of 5G.

In order to achieve such a high data rate and ultra-low latency, it has been considered to implement the 6G communication systems in a terahertz band (for example, 95 GHz to 3 THz bands). It is expected that, due to more severe path loss and atmospheric absorption in the terahertz bands than those in mmWave bands introduced in 5G, technologies capable of securing the signal transmission distance, that is, coverage, will become more important. It is necessary to develop, as major technologies for securing the coverage, radio frequency (RF) elements, antennas, novel waveforms having better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, in order to improve the coverage of terahertz-band signals, there has been ongoing discussion about new technologies such as metamaterial-based lenses and antennas, a high-dimensional spatial multiplexing technology using orbital angular momentum (OAM), reconfigurable intelligent surface (RIS), and the like.

Moreover, in order to improve spectral efficiency and overall network performance, the following technologies have been developed for 6G communication systems: a full-duplex technology for enabling an uplink transmission and a downlink transmission to simultaneously use the same frequency resource at the same time; a network technology for using satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; use of artificial intelligence (AI) in wireless communication for improvement of overall network operation by using AI in a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in the 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of the 6G communication systems in hyper-connectivity, including person to machine (P2M) as well as machine to machine (M2M), will facilitate the next hyper-connected experience. In more detail, it is expected that services such as truly immersive extended reality (XR), high-fidelity mobile hologram, and digital replication could be provided through the 6G communication systems. In addition, services such as remote surgery for security and reliability enhancement, industrial automation, and emergency response will be provided through the 6G communication system, such that the technologies could be applied in various fields such as industry, medical care, automobiles, home appliances, and the like. In the 6G communication system, an efficient design consisting of multiple hops to guarantee sustainable connectivity between devices in the network structure field receives attention. Combination of wireless backhaul connection between base stations and a service entity so as to compensate for a short communication range in an integrated access and backhaul (IAB) system may guarantee connectivity for a user who uses a network.

DISCLOSURE

Technical Problem

An embodiment of the present disclosure may provide a technology for managing mobility of a lower node together when an integrated access and backhaul (IAB) node performs inter-central unit (CU) handover, so as to decrease latency in provision of a network service to the lower node.

An embodiment of the present disclosure may provide a technology capable of preventing occurrence of unnecessary control signaling by performing in an integrated manner radio resource control (RRC) re-establishment procedures of lower nodes connected to an IAB node to perform handover.

Technical Solution

Provided is a method, performed by a first gNodeB (gNB)-central unit (CU), of supporting an integrated access and backhaul (IAB) node in performing handover to a second gNB-CU in a wireless communication system, the method being disclosed as a technical means to achieve the aforementioned technical problems and including transmitting handover information to at least one lower node connected to the IAB node, the handover information being determined based on a measurement report for handover of the IAB node, transmitting a handover request message including the handover information of the IAB node to the second gNB-CU, receiving context information from the at least one lower node, based on the context information, identifying, as a first class, a lower node to perform intra-CU handover from among the at least one lower node, and identifying, as a second class, a lower node to perform inter-CU handover from among the at least one lower node, supporting intra-CU handover of the lower node identified as the first class, and supporting inter-CU handover of the IAB node to the second gNB-CU, based on the handover information of the IAB node and a handover acceptance message of the IAB node which is received from the second gNB-CU.

Provided is a method, performed by a second gNB-CU, of supporting an IAB node in performing handover from a first gNB-CU in a wireless communication system, the method being disclosed as a technical means to achieve the aforementioned technical problems and including receiving, from the first gNB-CU, a handover request message including handover information determined based on a measurement report for handover of the IAB node, transmitting a handover acceptance message of the IAB node to the first gNB-CU, in response to the handover request message, supporting the IAB node in performing inter-CU handover from the first gNB-CU, and performing a radio resource control (RRC) connection re-establishment procedure on the IAB node, and performing an RRC connection re-establishment procedure on a lower node connected to the IAB node.

Provided is a method of performing, by an IAB node, handover from a first gNB-CU to a second gNB-CU in a wireless communication system, the method being disclosed as a technical means to achieve the aforementioned technical problems and including transmitting a measurement report for handover to the first gNB-CU, identifying, as a first class, a lower node to perform intra-CU handover from among at least one connected lower node, and identifying, as a second class, a lower node to perform inter-CU handover from among at least one connected lower node, supporting intra-CU handover of the lower node identified as the first class, receiving a handover acceptance message from the second gNB-CU via the first gNB-CU, and performing, based on the handover acceptance message, handover from the first gNB-CU to the second gNB-CU.

Provided is a first gNB-CU to support an IAB node in performing handover to a second gNB-CU in a wireless communication system, the first gNB-CU being disclosed as a technical means to achieve the aforementioned technical problems and including a transceiver, and at least one processor. The at least one processor may be configured to transmit handover information to at least one lower node connected to the IAB node, the handover information being determined based on a measurement report for handover of the IAB node, transmit a handover request message including the handover information of the IAB node to the second gNB-CU, receive context information from the at least one lower node, based on the context information, identify, as a first class, a lower node to perform intra-CU handover from among the at least one lower node, and identifying, as a second class, a lower node to perform inter-CU handover from among the at least one lower node, support intra-CU handover of the lower node identified as the first class, and support inter-CU handover of the IAB node to the second gNB-CU, based on the handover information of the IAB node, and a handover acceptance message of the IAB node which is received from the second gNB-CU.

Provided is a second gNB-CU to support an IAB node in performing handover from a first gNB-CU in a wireless communication system, the second gNB-CU being disclosed as a technical means to achieve the aforementioned technical problems and including a transceiver, and at least one processor. The at least one processor may be configured to receive, from the first gNB-CU, a handover request message including handover information determined based on a measurement report for handover of the IAB node, transmit a handover acceptance message of the IAB node to the first gNB-CU, in response to the handover request message, support the IAB node in performing inter-CU handover from the first gNB-CU, and perform a radio resource control (RRC) connection re-establishment procedure on the IAB node, and performing an RRC connection re-establishment procedure on a lower node connected to the IAB node.

Provided is an IAB node to perform handover from a first gNB-CU to a second gNB-CU according to a change in mobility or electric waves environment in a wireless communication system, the IAB node being disclosed as a technical means to achieve the aforementioned technical problems and including a transceiver, and at least one processor. The at least one processor included in a gNB or the IAB may be configured to transmit a measurement report for handover to the first gNB-CU, identify, as a first class, a lower node to perform intra-CU handover from among at least one connected lower node, and identify, as a second class, a lower node to perform inter-CU handover from among at least one connected lower node, support intra-CU handover of the lower node identified as the first class, receive a handover acceptance message from the second gNB-CU via the first gNB-CU, and perform, based on the handover acceptance message, handover from the first gNB-CU to the second gNB-CU.

A computer-readable recording medium being disclosed as a technical means to achieve the aforementioned technical problems may have stored therein a program for executing at least one of embodiments of the disclosed method, on a computer.

MODE FOR INVENTION

Figure 1:
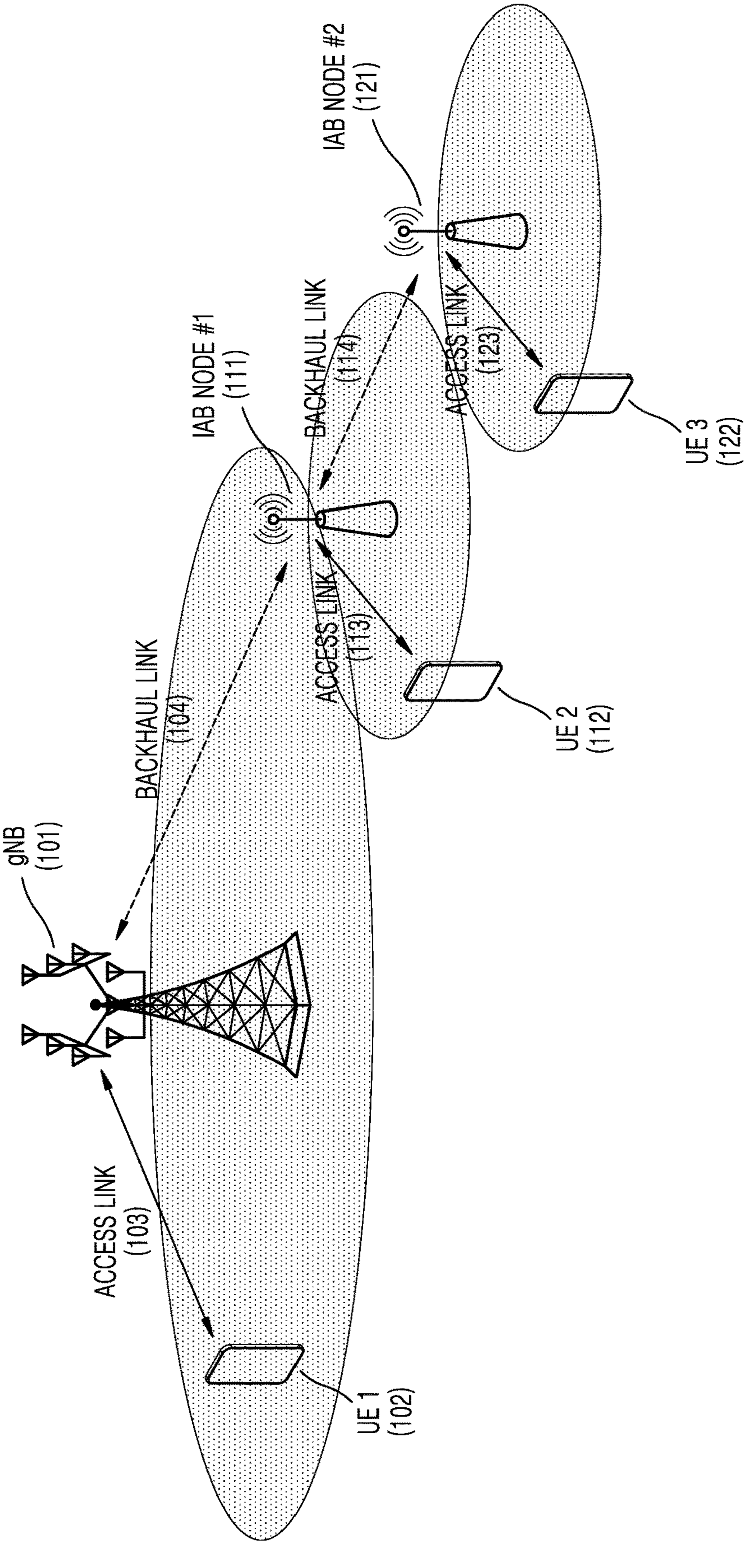
FIG. 1 illustrates a communication system where an integrated access and backhaul (IAB) node is operated according to an embodiment of the present disclosure.

Hereinafter, embodiments of the present disclosure will now be described more fully with reference to the accompanying drawings.

In the descriptions of the present disclosure, certain detailed explanations of the related art which are well known in the art to which the present disclosure belongs and are not directly related to the present disclosure are omitted. By omitting unnecessary explanations, the essence of the present disclosure may not be obscured and may be explicitly conveyed. The terms used in the specification are defined in consideration of functions used in the present disclosure, and can be changed according to the intent or commonly used methods of users or operators. Accordingly, definitions of the terms are understood based on the entire description of the present specification.

For the same reason, some elements in the drawings are exaggerated, omitted, or schematically illustrated. Also, the size of each element does not entirely reflect the actual size. In the drawings, the same or corresponding elements are denoted by the same reference numerals.

Advantages and features of the disclosure and methods of accomplishing the same may be understood more readily by reference to the following detailed descriptions of embodiments and accompanying drawings of the present disclosure. The present disclosure may, however, be embodied in many different forms and should not be construed as being limited to the embodiments set forth herein. Rather, these embodiments are provided so that the disclosure will be thorough and complete and will fully convey the concept of the present disclosure to one of ordinary skill in the art, and the present disclosure will only be defined by the appended claims. Throughout the specification, like reference numerals denote like elements. In the descriptions of the present disclosure, detailed explanations of the related art are omitted when it is deemed that they may unnecessarily obscure the essence of the present disclosure. The terms used in the specification are defined in consideration of functions used in the present disclosure, and can be changed according to the intent or commonly used methods of users or operators. Accordingly, definitions of the terms are understood based on the entire description of the present specification.

Hereinafter, a base station (BS) is an entity that allocates resources to a user equipment (UE), and may be at least one of a gNode B, an eNode B, a Node B, (or an xNode B, where, x indicates an alphabet letter including g or e), a radio access unit, a BS controller, a satellite, an airborne entity, or a node on a network. A user equipment (UE) may include a mobile station (MS), a vehicle, a satellite, an airborne entity, a cellular phone, a smartphone, a computer, or a multimedia system enabled to perform a communication function. However, the BS and the UE are not limited to the examples above. In the present disclosure, a downlink (DL) may be a wireless transmission path of a signal transmitted from a BS to a UE, and an uplink (UL) may be a wireless transmission path of a signal transmitted from a UE to a BS.

Although long term evolution (LTE), LTE-Advanced (LTE-A), or 5th generation (5G) system is mentioned as an example in the following description, embodiments of the present disclosure may also be applied to other communication systems having similar technical backgrounds or channel types. For example, 5G-Advance or New Radio (NR)-Advance or 6th generation (6G) mobile communication technology, which is developed after a 5G mobile communication technology (or NR), may be included therein, and hereinafter, 5G may refer to a concept including LTE, LTE-A, and other similar communication services. The present disclosure is applicable to other communication systems through modification at the discretion of one of ordinary skill in the art without greatly departing from the scope of the present disclosure.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" as used in the present embodiment refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, according to an embodiment, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units". Further, the elements and " . . . units" may be implemented to operate one or more central processing units (CPUs) in a device or a secure multimedia card. Also, according to some embodiments, a " . . . unit" may include one or more processors.

Hereinafter, terms indicating an access node, terms indicating broadcasting information, terms indicating control information, terms related to communication coverage, terms indicating a state change (e.g., event), terms indicating network entities, terms indicating messages, terms indicating elements of an apparatus, or the like, as used in the following description, are exemplified for convenience of descriptions. Accordingly, the present disclosure is not limited to terms to be described below, and other terms indicating objects having equal technical meanings may be used.

Hereinafter, for convenience of descriptions, terms and names defined in the most recent LTE and new radio (NR) standards from among current communication standards, the LTE and NR standards being defined by the 3rd Generation Partnership Project Long Term Evolution (3GPP LTE) group, may be used. However, embodiments of the present disclosure are not limited to these terms and names, and may be equally applied to communication systems conforming to other standards.

In 5G, when a BS transmits or receives data to or from a UE in bands equal to or greater than 6 GHz, millimeter wave (mmWave) bands in particular, coverage may be limited due to propagation path attenuation. The coverage limitation may be solved by arranging a plurality of relays (or relay nodes) densely in a propagation path between the BS and the UE, however, significant costs for installing optical cables for connecting backhauls between the relays may be a problem. Therefore, instead of installing the optical cables between the relays, a wideband radio frequency resource available for mmWave may be used to transmit or receive backhaul data between the relays so as to solve the costs problem of installing optical cables and more efficiently use the mmWave band.

A technology to use mmWave to transmit or receive backhaul data from the BS and transmit or receive access data finally to the UE via the plurality of relays as described above is referred to as integrated access and backhaul (IAB), and in this regard, a relay node that transmits or receives data to or from the BS by using wireless backhaul is referred to as an IAB node. The IAB node may have a capability of freely configuring topology between relays, and a capability of actively configuring configuration of an access link and allocation of resources for efficient usage of radio resources with respect to a backhaul or a connected access. The BS includes a central unit (CU) and a distributed unit (DU), and the IAB node includes a DU and a mobile termination (MT). The CU may control DUs of all IAB nodes connected to the BS via multi-hops.

The IAB node may use different frequency bands or the same frequency band so as to receive backhaul data from the BS and transmit access data to the UE and to receive access data from the UE and transmit backhaul data to the BS. When using the same frequency band, the IAB node has a half-duplex constraint in an instant. Accordingly, as a method of reducing transmission and reception latency due to the half-duplex constraint of the IAB node, the IAB node, on reception, may perform frequency division multiplexing (FDM) and/or space division multiplexing (SDM) on backhaul data (downlink (DL) data from a DU of a parent IAB node to the MT of the IAB node and uplink (UL) data from an MT of a child IAB node to the DU of the IAB node) and access data from the UE (UL data from the UE to the IAB node).

Also, the IAB node, for transmission, may perform FDM and/or SDM on backhaul data (UL data from the MT of the IAB node to the DU of a parent IAB node and DL data from the DU of the IAB node to the MT of a child IAB node) and access data to the UE (DL data from the IAB node to the UE).

FIG. 1 illustrates a communication system where an IAB node is operated according to an embodiment of the present disclosure.

Referring to FIG. 1, a gNB 101 is a common BS (e.g., eNB or gNB), and in the present disclosure, the gNB 101 is referred to as a gNB, eNB, BS, donor BS, donor IAB, or IAB donor. The IAB donor node 101 is a gNodeB (gNB) that includes a CU entity capable of controlling connected other node and provides a function of supporting a high bandwidth backhaul with respect to an IAB node #1 111 directly connected to a core network. That is, the IAB donor node 101 is a gNB that provides a network access to a UE via a network of a backhaul and an access link.

The IAB node #1 111 and an IAB node #2 121 are IAB nodes configured to transmit or receive a backhaul link in a high bandwidth wireless channel including mmWave. The IAB nodes are each a radio access network (RAN) node configured to provide a function of supporting UE connection to the network (core network) via an NR backhaul. That is, the IAB nodes may be RAN nodes configured to support NR access links for UEs and NR backhaul links for an upper node (also referred to as the parent node) and a lower node (also referred to as the child node).

NR backhaul links 104 and 114 indicate NR links between the IAB nodes 111 and 112 and the IAB donor node 101, and indicate NR links used in backhauling between the IAB nodes 111 and 112 for a multi-hop network.

A UE 1 102 transmits or receives access data to or from the gNB 101 via an access link 103. The IAB node #1 111 transmits or receives backhaul data to or from the gNB 101 via the backhaul link 104. A UE 2 112 transmits or receives access data to or from the IAB node #1 111 via an access link 113. The IAB node #2 121 transmits or receives backhaul data to or from the IAB node #1 111 via the backhaul link 114. Therefore, the IAB node #1 111 may be an upper IAB node of the IAB node #2 121 and may be referred to as a parent IAB node or a parent node. On the contrary, the IAB node #2 121 may be a lower IAB node of the IAB node #1 111 and may be referred to as a child IAB node or a child node. A UE 3 122 transmits or receives access data to or from the IAB node #2 121 via an access link 123.

Next, measurement of an IAB node or a donor gNB performed by a UE will now be described.

Coordination between the donor gNB and the IAB nodes may be required for the UE 2 112 or the UE 3 122 to perform measurement on the neighboring donor gNB or a neighboring donor IAB node which is not a serving IAB node. The UE may receive a control signal for a configuration to measure a synchronization signal block (SSB)/physical broadcast channel (PBCH) or a channel state information reference signal (CSI-RS) for measurement of a neighboring IAB node, from an IAB node providing a service or a BS including a donor gNB via a path of a network connected to the donor gNB.

Next, measurement of an IAB node performed by another IAB node or the donor gNB will now be described. Coordination between the donor gNB and the IAB nodes may be required for a particular IAB node to perform measurement on another neighboring donor gNB or another neighboring IAB node. The particular IAB node may receive an upper layer signal for a configuration to measure an SSB/PBCH or a CSI-RS for measurement of a neighboring IAB node, from a serving IAB node or BS.

Figure 2A:
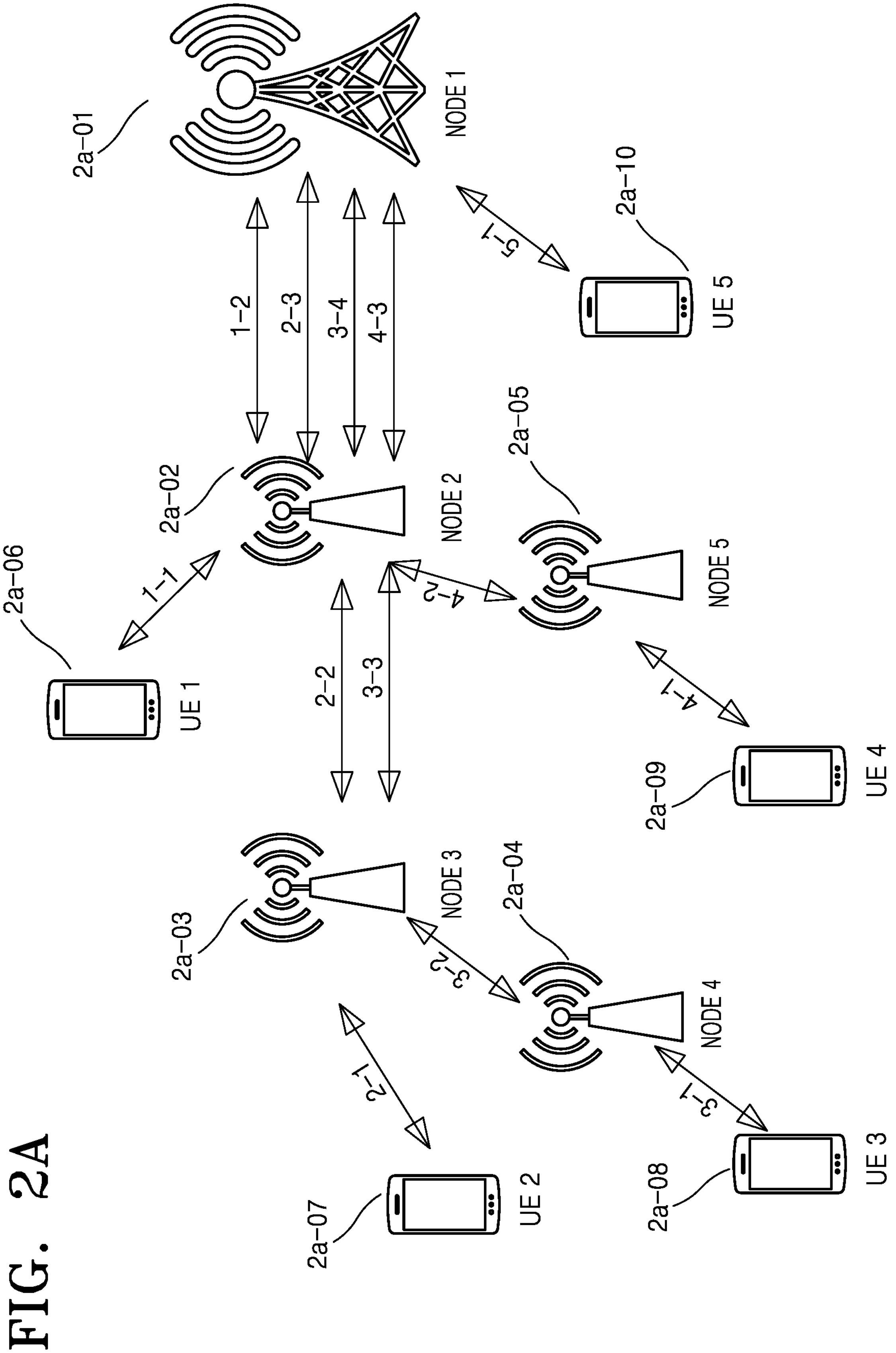
FIG. 2A is a diagram illustrating a network structure of a wireless communication system, according to an embodiment of the present disclosure.

FIG. 2A is a diagram illustrating a network structure of a wireless communication system, according to an embodiment of the present disclosure. In more detail, FIG. 2A is a diagram illustrating the network structure supporting a wireless backhaul, in the wireless communication system according to an embodiment of the present disclosure.

Referring to FIG. 2A, an IAB network may include a plurality of wireless nodes (e.g., an IAB node or an IAB donor node). In the IAB network, a UE may configure RRC connection by accessing a random radio node, and may transmit or receive data. Also, each of radio nodes as child nodes may consider other radio node as a parent node, and may transmit or receive data by configuring RRC connection to the parent node.

In an embodiment, the child node may indicate a UE or an IAB node, and may indicate a radio node configured to receive and apply wireless connection access configuration, RRC configuration information, bearer configuration information, and configuration information of each packet data convergence protocol (PDCP) or radio link control (RLC) or medium access control (MAC), or physical (PHY) layer from the parent node (or the IAB donor node).

In an embodiment, the parent node may indicate an IAB node or an IAB donor node. The parent node may indicate a radio node configured to configure the child node for wireless connection access configuration, RRC configuration information, bearer configuration information, and configuration information of each PDCP or RLC or MAC or PHY entity.

Referring to FIG. 2A, an IAB donor node may indicate a radio node 1 (Node 1) 2*a*-01 connected to a core network so as to transfer and receive data to and from the core network. Also, an IAB node may indicate each of radio node 2 (Node 2) 2*a*-02 to radio node 5 (Node 5) 2*a*-05 configured to perform a function of transferring data so as to assist data transceiving between a UE and an end of the IAB donor node.

UEs 2*a*-06, 2*a*-07, 2*a*-08, and 2*a*-09 may access radio nodes (e.g., the IAB node or the IAB donor node), may request link establishment to a donor gNB, may receive approval for this, and may transmit or receive data to or from the core network. For example, the UE 2 2*a*-07 may configure RRC connection by accessing the radio node 3 2*a*-03, and may transmit or receive data. The radio node 3 2*a*-03 may receive data to be transmitted to the UE 2 2*a*-07 from the radio node 3 2*a*-03 or may transmit data received from the UE 2 2*a*-07 to the radio node 3 2*a*-03 that is a parent node. Also, the radio node 2 2*a*-02 may receive data to be transmitted to the radio node 3 2*a*-03 from the radio node 1 (IAB donor node) 2*a*-01 or may transmit data received from the radio node 3 2*a*-03 to the radio node 1 (IAB donor node) 2*a*-01 that is a parent node.

The UE 1 2*a*-06 may configure RRC connection by accessing the radio node 2 2*a*-02, and may transmit or receive data. The radio node 2 2*a*-02 may receive data to be transmitted to the UE 1 2*a*-06 from the radio node 1 2*a*-01 or may transmit data received from the UE 1 2*a*-06 to the radio node 1 2*a*-01 that is a parent node.

In an embodiment, a UE may access a radio node having a signal with highest strength, may request RRC configuration, may complete configuration of a link to a donor gNB, and then may transmit or receive data. Also, in an embodiment, an IAB network may support multi-hop data transfer via intermediate radio nodes so as to allow the UE to transfer data to a radio node connected to the core network and to receive data from the radio node connected to the core network.

When communication is performed between the core network and UEs in topology configured of multiple hops of IAB nodes, a radio link failure (RLF) may occur in each IAB node, according to a channel status. When an RLF occurs in an IAB node at an intermediate hop, connection is stopped between child nodes and UEs which are connected to the node. When the RLF state continues in the IAB node at the intermediate hop, connection stop in lower nodes and the UEs continues until recovery of connection is confirmed by an RRC control signal.

When communication is performed between the core network and UEs in topology configured of multiple hops of IAB nodes, an access point of the core side is an IAB donor node. The IAB donor node includes a CU, and controls a control of a DU, and an operation of data transceiving with respect to a UE via the DU, In a connection failure or normal RRC release, a UE receiving a service from a UE part (MT) of an intermediate IAB node or the IAB node may perform again an initial connection operation on a previously-connected IAB so as to re-access a network or may perform handover to other IAB node in the same IAB donor node to which the UE previously belongs. In a case of intra-CU handover, as a PDCP entity and an RRC entity exist in a CU, packet loss and a security refresh process due to PDCP reestablishment may be skipped, and thus, a time of a control signal transfer process due to handover may be decreased.

Figure 2B:
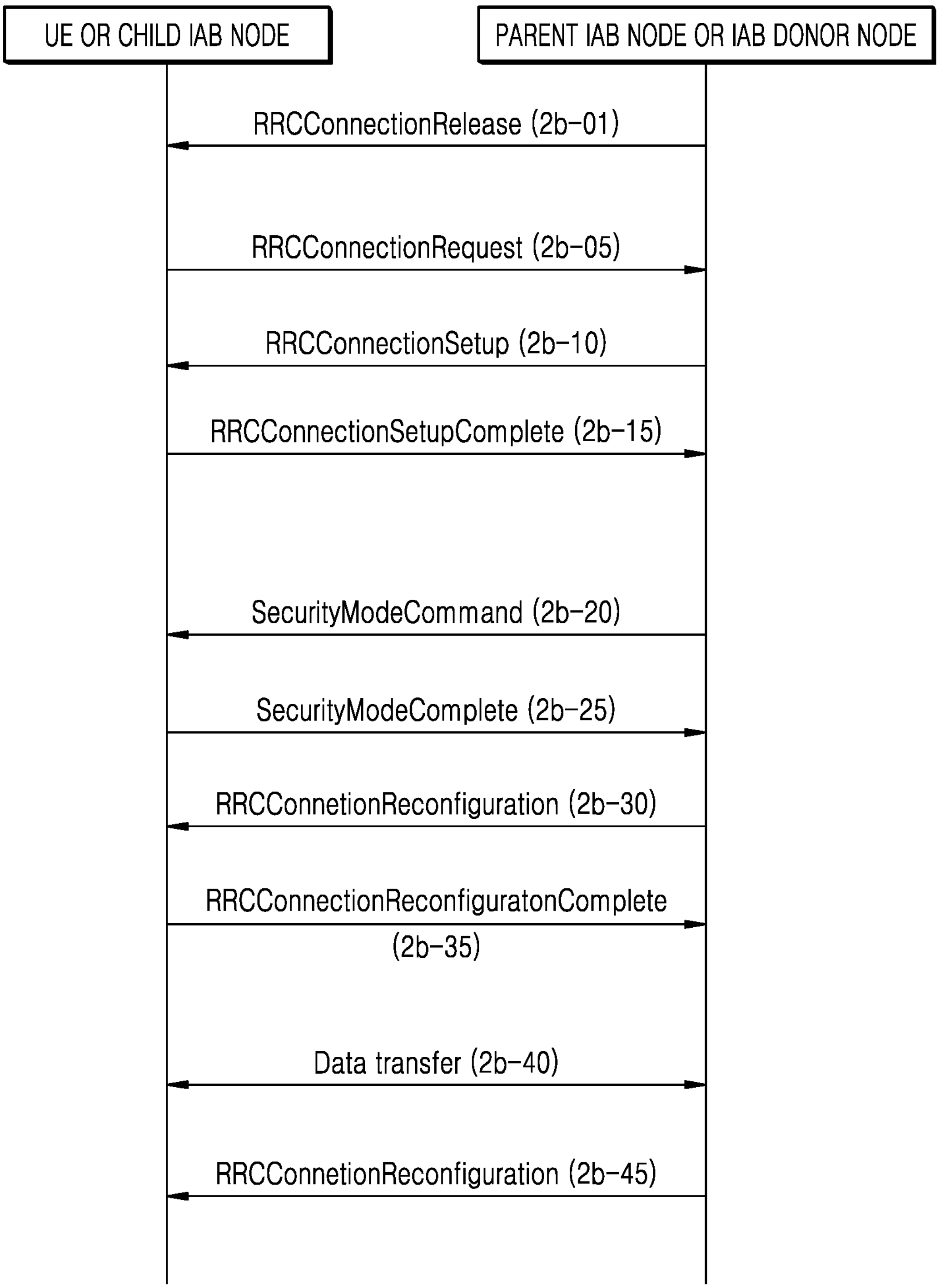
FIG. 2B is a diagram for describing an operation of a user equipment (UE) to perform radio resource control (RRC) connection configuration in a communication system in which IAB nodes operate, according to an embodiment of the present disclosure.

FIG. 2B is a diagram for describing an operation of a UE to perform RRC connection configuration in a communication system in which IAB nodes operate, according to an embodiment of the present disclosure. In more detail, FIG. 2B is a diagram for describing a method of performing RRC connection configuration when a UE configures connection to a radio node (IAB node or IAB donor node) or a child ode configures connection to a parent node (IAB node or IAB donor node) in a wireless backhaul network (IAB) according to an embodiment of the present disclosure. Through such RRC connection control, a donor node may transfer a UE identifier, a UE bearer identifier, a quality of service (QoS) identifier, a radio node identifier, a radio node address, or QoS information to a UE via a child node. The donor node may transfer network state information to the UE via the child node, and based on this, may control connectivity to the UE. Also, the donor node may provide additional information such as a congestion level, a queuing delay, one-hop air latency between radio nodes, which are available for the UE to determine handover.

Referring to FIG. 2B, in operation 2*b*-01, the IAB donor node may transfer an RRC control message to the UE via other child node. The RRC control message may be generated in the IAB donor node including a CU, and a parent node (including the IAB donor node or a gNB BS) of IAB nodes may transfer the generated control message. In a case where a UE or a child node that transceives data in an RRC connected mode does not transceive data for a preset reason or a preset time, the IAB donor node may transmit an RRCConnectionRelease message to the UE or the child node and thus may control the UE or the child node to switch to an RRC idle mode or an RRC inactive mode. In an embodiment, when a UE or a child node for which next current connection is not configured (hereinafter, an idle mode UE) has data for transmission, the idle mode UE may perform an RRC connection establishment procedure with the parent node, in an RRC idle mode, and may perform an RRC connection resume procedure with the parent node, in an RRC inactive mode.

In operation 2*b*-05, the UE or the child node may establish backward transmission synchronization with the parent node via a random access procedure and may transmit an RRCConnectionRequest message (or an RRCResumeRequest message) to the parent node. The RRCConnectionRequest message (or the RRCResumeRequest message) may include an identifier of the UE or the child node, establishmentCause, or the like.

In operation 2*b*-10, the parent node may transmit an RRCConnectionSetup message (or an RRCResume message) for the UE or the child node to establish RRC connection. The RRCConnectionSetup message (or the RRCResume message) may include at least one of configuration information for each logical channel, configuration information for each bearer, configuration information of a PDCP layer, configuration information of an RLC layer, and configuration information of an MAC layer.

The RRCConnectionSetup message (or the RRCResume message) may include an indicator indicating whether to perform retransmission of pre-configured RRC messages to a target parent node when the child node performs handover. The parent node may configure, by using the indicator, whether to perform retransmission of pre-configured RRC messages to a target parent node when the child node performs handover. For example, the parent node may indicate to perform retransmission of RRC message which were transmitted within few seconds before a handover indication message is received, before the child node performs handover, or before an RRC configuration message is received. Also, the parent node may perform indication on the pre-configured RRC messages, respectively. That is, multiple indicators may indicate whether to perform retransmission of respective RRC messages. Alternatively, the parent node may indicate whether to perform retransmission in the form of a bitmap indicating each RRC message.

The RRCConnectionSetup message (or the RRCResume message) may include an indicator indicating to perform a PDCP data recovery procedure, in PDCP configuration information. Also, the RRCConnectionSetup message may include, in bearer configuration information, an indicator indicating whether to perform a PDCP data recovery procedure on a signaling radio bearer (SRB) or a data radio bearer (DRB). Also, the RRCConnectionSetup message may include, in the bearer configuration information, an indicator indicating whether to discard a plurality of pieces of data existing in a PDCP layer on the SRB or the DRB.

The RRCConnectionSetup message (or the RRCResume message) may include, in the bearer configuration information, an indicator indicating whether to perform accumulated retransmission or selective retransmission on an AM DRB when a PDCP reestablishment procedure is performed.

The RRCConnectionSetup message (or the RRCResume message) may include an indicator indicating which ARQ function is to be used in the child node. The donor node may indicate whether to use a hop-by-hop automatic repeat request (ARQ) function or an end-to-end ARQ function, by using the indicator of the RRCConnectionSetup message. When configuring the end-to-end ARQ function, the parent node may indicate whether to perform only a function of transferring received RLC-layer data in segmentation or as a whole or whether to perform an ARQ function by the child node as an end. Also, the parent node may indicate which ARQ function is to be used as a default function, and may pre-configure to use one of the hop-by-hop ARQ function or the end-to-end ARQ function as a default function when the ARQ function is not configured in the message. Also, the donor node may indicate the child node whether to use a data segmentation function, and may indicate whether to activate (or use) each function of an RLC layer, by using the RRCConnectionSetup message.

The RRCConnectionSetup message (or the RRCResume message) may include an indicator indicating an adaptation layer whether to use a data concatenation function. Also, the RRCConnectionSetup message may include an indicator indicating whether to configure a header of the adaptation layer, and may configure a type of the header. For example, the donor node may configure, by using the RRCConnectionSetup message, which information among a UE identifier, a UE bearer identifier, a QoS identifier, a radio node identifier, a radio node address, QoS information, or the like is to be included in the header. In an embodiment, the donor node may configure that the header is to be skipped to decrease overhead.

The donor node may configure, by using the RRCConnectionSetup message (or the RRCResume message), an RLC channel to be used between a transmission adaptation layer and a reception adaptation layer or between the child node and the parent node or in the UE and the radio node.

The RRCConnectionSetup message (or the RRCResume message) may include an indicator indicating whether to perform PDCP status reporting-based retransmission in configuration information (pdcp-config) of the PDCP layer.

In order to indicate whether to perform PDCP status reporting-based retransmission, the RRCConnectionSetup message (or the RRCResume message) may include a PDCP data recovery indicator (recoverPDCP) in the configuration information (pdcp-config) of the PDCP layer.

The RRCConnectionSetup message (or the RRCResume message) may include an indicator indicating to periodically transmit PDCP status reporting to periodically transmit PDCP status reporting, in the configuration information (pdcp-config) of the PDCP layer. Also, by using the RRCConnectionSetup message, the periodicity or timer value may be configured. When the indicator and the configuration are received, the UE or the child node may trigger PDCP status reporting according to the periodicity or expiry of the timer value and may transmit the PDCP status reporting.

The RRCConnectionSetup message (or the RRCResume message) may include, in the configuration information (pdcp-config) of the PDCP layer, an indicator indicating to transmit PDCP status reporting so as to trigger and transmit PDCP status reporting. Also the timer value may be configured by using the RRCConnectionSetup message. The PDCP layer may obtain information that can be used according to whether data loss due to instability of a network can be recovered, via a timer.

By using the RRCConnectionSetup message (or the RRCResume message), a PDCP status report prohibit timer to prevent frequent triggering of PDCP status reporting may be configured in the configuration information (pdcp-config) of the PDCP layer.

By using the RRCConnectionSetup message (or a separate newly-defined RRC message or the RRCResume message), information about the parent node or the child node such as a congestion level, a queuing delay, one-hop air latency between radio nodes, or the like, which is usable for the radio mass, Also, the number of radio hops from a radio node receiving the RRCConnectionSetup message to an uppermost radio node (IAB donor node) may be indicated. A radio node having received the number of radio hops via the RRC message may increase the indicated number by 1 and may inform the number to a next child node.

In operation 2*b*-15, the UE or the child node having configured RRC connection may transmit an RRCConnetionSetupComplete message (or an RRCResumeComplete message) to the parent node.

The RRCConnetionSetupComplete message may include Service Request that is a control message for requesting an access and mobility management function (AMF) or a mobility management entity (MME) for bearer configuration for a preset service, the Service Request being made by the UE or the child node via the donor node. The donor node may transmit the Service Request message included in the RRCConnetionSetupComplete message to the AMF or the MME. The AMF or the MME may determine whether to provide the service requested by the UE or the child node.

If it is determined to provide the service requested by the UE or the child node, as a result of the determination, the AMF or the MME may transmit an Initial Context Setup Request message to the donor node. The Initial Context Setup Request message may include information such as QoS information to be applied when a DRB is configured, security-associated information (e.g., Security Key, Security Algorithm) to be applied to the DRB, or the like.

In operation 2*b*-20 to operation 2*b*-25, the donor node may exchange a SecurityModeCommand message and a SecurityModeComplete message with the UE or the child node so as to configure security. In operation 2*b*-30, when security configuration is completed, the donor node may transmit an RRCConnectionReconfiguration message to the UE or the child node.

By using the RRCConnectionReconfiguration message, the donor node may configure an indicator indicating whether to retransmit pre-configured RRC messages to a target parent node when the UE or the child node performs handover. For example, the donor node may indicate to perform retransmission of RRC message which were transmitted within few seconds before a handover indication message is received, before handover is performed, or before an RRC message is received. Also, the indicator may be indicated for each of the pre-configured RRC messages. That is, multiple indicators may indicate whether to perform retransmission of respective RRC messages. Alternatively, the indication of retransmission may be indicated in the form of a bitmap indicating each RRC message.

The RRCConnectionReconfiguration message may include an indicator indicating to perform a PDCP data recovery procedure, in PDCP configuration information. Also, the RRCConnectionReconfiguration message may include, in bearer configuration information, an indicator indicating whether to perform a PDCP data recovery procedure on a signaling radio bearer (SRB) or a data radio bearer (DRB). Also, the RRCConnectionReconfiguration message may include, in the bearer configuration information, an indicator indicating whether to discard a plurality of pieces of data existing in a PDCP layer on the SRB or the DRB. The RRCConnectionReconfiguration message may include, in the bearer configuration information, an indicator indicating whether to perform accumulated retransmission or selective retransmission on an AM DRB when a PDCP reestablishment procedure is performed.

The RRCConnectionReconfiguration message may include an indicator indicating which ARQ function is to be used in the child node, and whether a hop-by-hop ARQ function is to be used or whether an end-to-end ARQ function is to be used may be indicated by using the indicator. When configuring the end-to-end ARQ function, the donor node may indicate whether to perform only a function of transferring received RLC-layer data in segmentation or as a whole or whether to perform an ARQ function by the child node as an end. Also, the donor node may indicate which ARQ function is to be used as a default function, and may pre-configure to use one of the hop-by-hop ARQ function or the end-to-end ARQ function as a default function when the ARQ function is not configured in the RRCConnectionReconfiguration message. Also, the donor node may indicate the child node whether to use a data segmentation function, and may indicate whether to activate (or use) each function of an RLC layer, by using the RRCConnectionReconfiguration message.

The RRCConnectionReconfiguration message may include an indicator indicating an adaptation layer whether to use a data concatenation function. Also, the RRCConnectionReconfiguration message may include an indicator indicating whether to configure a header of the adaptation layer, and the parent node may configure a type of the header. For example, the parent node may configure which information among a UE identifier, a UE bearer identifier, a QoS identifier, a radio node identifier, a radio node address, QoS information, or the like is to be included in the header. The donor node may configure that the header is to be skipped to decrease overhead.

The donor node may configure, by using the RRCConnectionReconfiguration message, an RLC channel to be used between a transmission adaptation layer and a reception adaptation layer or between the child node and the parent node or in the UE and the radio node.

The RRCConnectionReconfiguration message may include an indicator indicating whether to perform PDCP status reporting-based retransmission in configuration information (pdcp-config) of the PDCP layer.

In order to indicate whether to perform PDCP status reporting-based retransmission, the RRCConnectionReconfiguration message may include a PDCP data recovery indicator (recoverPDCP) in the configuration information (pdcp-config) of the PDCP layer. The donor node may configure, by using the indicator, the UE or the child node to trigger a PDCP data recovery processing procedure and transmit PDCP status reporting.

The RRCConnectionReconfiguration message may include an indicator indicating to periodically transmit PDCP status reporting to periodically transmit PDCP status reporting, in the configuration information (pdcp-config) of the PDCP layer. Also, by using the RRCConnectionSetup message, the periodicity or timer value may be configured. When the indicator and the configuration are received, the UE or the child node may trigger PDCP status reporting according to the periodicity or expiry of the timer value and may transmit the PDCP status reporting.

The RRCConnectionReconfiguration message may include, in the configuration information (pdcp-config) of the PDCP layer, an indicator indicating to transmit PDCP status reporting so as to trigger and transmit PDCP status reporting. Also the timer value may be configured by using the RRCConnectionSetup message. When receiving the indicator and the configuration, the PDCP layer of the UE or the child node may trigger a timer having a timer value whenever a gap occurs in a PDCP serial number, may trigger PDCP status reporting in expiry of the timer if the gap in the PDCP serial number is not filled or if data corresponding to the PDCP serial number assumed as a loss is not received until the timer expires, and may configure and transmit the PDCP status reporting.

By using the RRCConnectionReconfiguration message, a PDCP status report prohibit timer to prevent frequent triggering of PDCP status reporting may be configured in the configuration information (pdcp-config) of the PDCP layer.

By using the RRCConnectionReconfiguration message (or a separate newly-defined RRC message or the RRCResume message), information about the parent node or the child node such as a congestion level, a queuing delay, one-hop air latency between radio nodes, or the like, which is usable for the radio mass, Also, the number of radio hops from a radio node receiving the RRCConnectionReconfiguration message to an uppermost radio node (IAB donor node) may be indicated. A radio node having received the number of radio hops via the RRC message may increase the indicated number by 1 and may inform the number to a next child node.

The RRCConnectionReconfiguration message may include configuration information of a DRB in which user data is to be processed. In operation **2*b*-35**, the UE or the child node may configure the DRB by applying the configuration information, and may transmit an RRCConnectionReconfigurationComplete message to the parent node. The parent node having completed DRB configuration with the UE or the child node may transmit an Initial Context Setup Complete message to the AMF or the MME and may complete connection.

In operation **2*b*-40, when the procedure is completed, the UE or the child node may transmit or receive data to or from the donor node via the core network. In an embodiment, a data transmission procedure may be configured of three steps which are RRC connection configuration, security configuration, and DRB configuration. In operation 2*b*-45, the donor node may transmit an RRCConnectionReconfiguration message to newly perform or add or change configuration for the UE or the child node, due to a preset reason. The RRCConnectionReconfiguration message of operation 2*b*-45 may be generated to be similar to the RRCConnectionReconfiguration message of operation 2*b*-30**.

In the present disclosure, the bearer may include an SRB and a DRB.

Figure 2C:
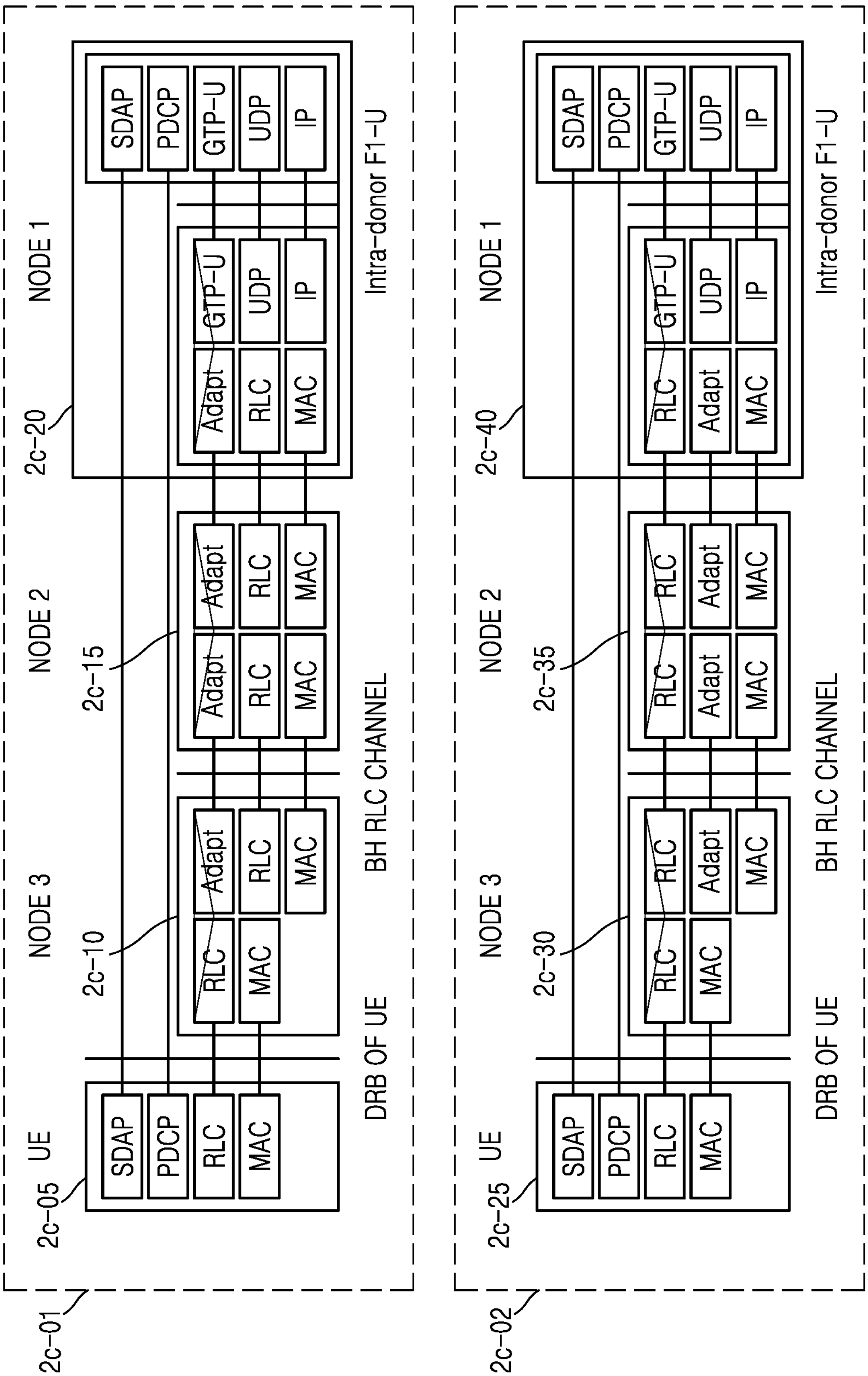
FIG. 2C illustrates protocol layers each of radio nodes can have in a wireless communication system, according to an embodiment of the present disclosure.

FIG. 2C illustrates protocol layers each of radio nodes can have in a wireless communication system, according to an embodiment of the present disclosure.

Referring to FIG. 2C, a protocol layer structure of radio nodes that support a wireless backhaul may be widely divided into two types. The two types are divided according to a position of an adaptation (ADAP) layer. The protocol layer structure may have a protocol layer structure **2*c*-01 in which the ADAP layer operates above an RLC layer and a protocol layer structure 2*c*-02** in which the ADAP layer operates below the RLC layer.

In FIG. 2C, a UE **2*c*-05 may include all of a PHY layer, a MAC layer, an RLC layer, a PDCP layer, and a service data association protocol (SDAP) layer as protocol layers. Radio nodes (e.g., radio nodes, a node 3 2*c*-10 or a node 2 2*c*-15, which perform a wireless backhaul function to receive and transfer data between the UE 2*c*-05 and an IAB donor node 2*c*-20) may operate the PHY layer, the MAC layer, the RLC layer, and the ADAP layer. Also, an uppermost radio node (e.g., a highest node, an IAB donor node, or a Node 1 2*c*-20**, which is connected to a core network so as to support a wireless backhaul transferring data) may operate all of a PHY layer, a MAC layer, an RLC layer, a PDCP layer and a SDAP layer. The uppermost radio node may include a CU and a DU connected by wire. In an embodiment, the CU entity may operate the SDAP layer and the PDCP layer, and the DU entity may operate the RLC layer, the MAC layer, and the PHY layer.

The ADAP layer may distinguish between a plurality of bearers determined by a plurality of UEs and IAB nodes belonging to a path, and may map bearers to RLC channels. When the ADAP layer distinguishes between the plurality of bearers of the plurality of UEs, the ADAP layer may group data, based on a UE or QoS and map the data to one RLC channel, may allow the grouped data to be processed, and may decrease overhead by grouping data mapped to one RC channel by using a data concatenation function. Here, the data concatenation function may indicate a function by which one header or a smaller number of headers are configured for a plurality of pieces of data, a header field indicating a plurality of pieces of concatenated data is indicated to distinguish between the plurality of pieces of data, and a header is not unnecessarily configured for each data, such that overhead can be decreased.

In the protocol layer structure **2*c*-01 of FIG. 2C, the radio node 3 2*c*-10 may operate the same first RLC layers as first RLC layers corresponding to respective data bearers of the UE 2*c*-05 so as to process data received from the UE 2*c*-05. Also, in the radio node 3 2*c*-10, an ADAP layer may process a plurality of pieces of data received from a plurality of RLC layers, and thus, may map the data to a new RLC channel and second RLC layers corresponding thereto. The ADAP layer of the radio node 3 2*c*-10** may distinguish between a plurality of bearers of a plurality of UEs and may map the bearers to an RLC channel. Also, when the ADAP layer distinguishes between the plurality of bearers of the plurality of UEs, the ADAP layer may group data, based on a UE or QoS and map the data to one RLC channel, and may allow the second RLC layers to group and process data. The RLC channel may be defined as a channel to transfer data according to QoS by grouping data of multiple UEs based on QoS information, and may be defined as a channel to transfer data by grouping data for each UE.

The radio node 3 2*c*-10 may perform a procedure for distributing a UL transmission resource received from the parent node. The radio node 3 2*c*-10 may perform a procedure for distributing a UL transmission resource according to QoS information of an RLC channel (or a second RLC layer), a priority order, the amount of transmittable data (e.g., the amount of data, token which is allowed for a current UL transmission resource) or the amount of data stored in a buffer with respect to the RLC channel (or the second RLC layer). Then, the radio node 3 2*c*-10 may perform data transmission of each RLC channel data to a parent node, by using a segmentation function or a concatenation function according to a distributed transmission resource.

The first RLC layer may indicate an RLC layer for processing a plurality of pieces of data corresponding to a bearer, similarly to an RLC layer corresponding to each bearer of a UE, and the second RLC layer may indicate an RLC layer for processing a plurality of pieces of data mapped by the ADAP layer, based on mapping information configured by the UE, a QoS, or the parent node.

In the protocol layer structure 2*c*-01 of FIG. 2C, the radio node 2 2*c*-15 may process transmission data so that the second RLC layer of a child node (the radio node 3 2*c*-10) can process data.

In the protocol layer structure 2*c*-01 of FIG. 2C, the uppermost radio node 1 2*c*-20 may operate second RLC layers corresponding to second RLC layers of a child node (the radio node 2 2*c*-15) and may process data according to an RLC channel. Then, an ADAP layer of the uppermost radio node 1 2*c*-20 may perform a function of mapping a plurality of pieces of data to PDCP layers corresponding to respective bearers of UEs, the data being processed with respect to the RLC channel. A PDCP layer of an uppermost radio node corresponding to each bearer of each UE may process a plurality of pieces of received data, may transfer and process data to a SDAP layer, and thus, may transfer the data to the core network.

In the protocol layer structure 2*c*-02 of FIG. 2C, the node 3 2*c*-30 may operate the same first RLC layers as first RLC layers corresponding to respective data bearers of the UE 2*c*-25 so as to process data received from the UE 2*c*-25. The node 3 2*c*-30 may process a plurality of pieces of data received from a plurality of RLC layers by equally operating first RLC layers. Also, an ADAP layer of the node 3 2*c*-30 may process the data processed from the first RLC layers and thus may map the data to new RLC channels. The ADAP layer may distinguish between a plurality of bearers of a plurality of UEs and may map the bearers to an RLC channel. Also, when the ADAP layer distinguishes between the plurality of bearers of the plurality of UEs, the ADAP layer may group data, based on a UE or QoS and map the data to one RLC channel, and may allow the data to be grouped and processed. The RLC channel may be defined as a channel to transfer data according to QoS by grouping data of multiple UEs based on QoS information, and may be defined as a channel to transfer data by grouping data for each UE so as to match a destination for each path.

The node 3 2*c*-30 may perform a procedure for distributing a UL transmission resource received from the parent node. In an embodiment, the node 3 2*c*-30 may perform a procedure for distributing a UL transmission resource according to QoS information of an RLC channel (or a second RLC layer), a priority order, the amount of transmittable data (e.g., the amount of data, token which is allowed for a current UL transmission resource) or the amount of data stored in a buffer with respect to the RLC channel. Then, the node 3 2*c*-30 may perform data transmission of each RLC channel data to a parent node, by using a segmentation function or a concatenation function according to a distributed transmission resource.

In the protocol layer structure 2*c*-02 of FIG. 2C, the node 2 2*c*-35 may process received data corresponding to the RLC channel of a child node (the node 3 2*c*-30) according to the RLC channel. An ADAP layer of the node 2 2*c*-35 may perform a function of mapping a plurality of pieces of data to first RLC layers corresponding to respective bearers of UEs, the data being received with respect to the RLC channel. A first RLC layer corresponding to each bearer of each UE of a radio node may process a plurality of pieces of received data, may re-transfer the data to a transmission first RLC layer, may perform processing, and then may re-transfer it to an ADAP layer. The ADAP layer may re-map a plurality of pieces of data received from the RLC layers to RLC channels, and may perform data transmission for transfer to a next parent node, according to distribution of a UL transmission resource.

In the protocol layer structure 2*c*-02 of FIG. 2C, the uppermost node 1 2*c*-40 may process data according to an RLC channel, the data being received with respect to the RLC channel of a child node (the node 2 2*c*-35). An ADAP layer of the uppermost node 1 2*c*-40 may perform a function of mapping a plurality of pieces of data received with respect to the RLC channel to first RLC layers respectively corresponding to the bearers of the UEs.

In an embodiment, a radio node may operate first RLC layers respectively corresponding to bearers of UEs, may process a plurality of pieces of received data, and thus, may transfer the data to PDCP layers respectively corresponding to the bearers of the UEs. A PDCP layer of an uppermost radio node corresponding to each bearer of each UE may process a plurality of pieces of received data, may transfer the data to a SDAP layer, may perform processing, and thus, may finally transfer the data to the core network.

Figure 2D:
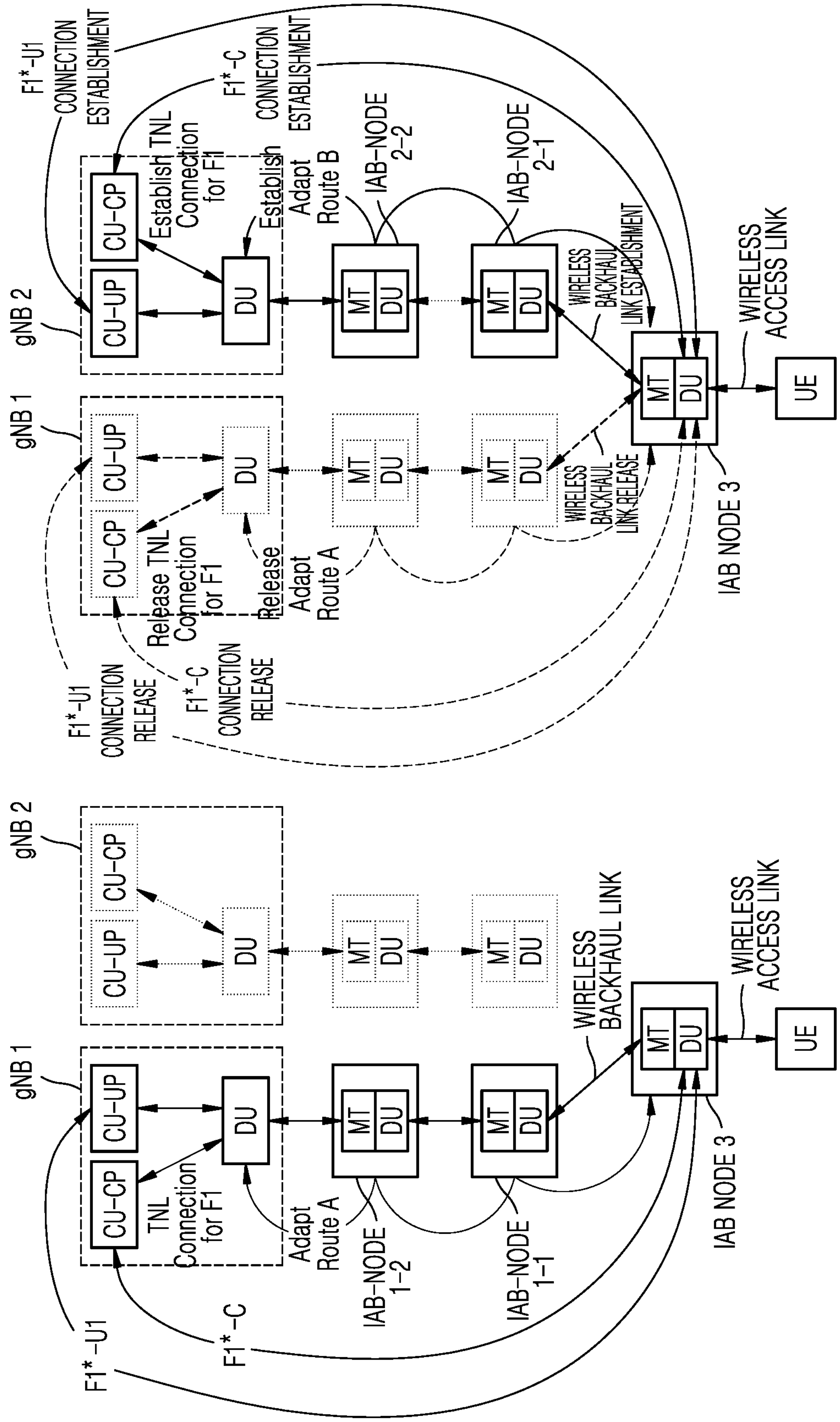
FIG. 2D is a diagram illustrating an operation in which an IAB node performs inter-central unit (CU) handover in a wireless communication system, according to an embodiment of the present disclosure.

FIG. 2D is a diagram illustrating an operation in which an IAB node 3 performs inter-CU handover in a wireless communication system, according to an embodiment of the present disclosure.

Referring to FIG. 2D, the wireless communication system may include a plurality of radio nodes, e.g., an IAB donor node 1 (gNB 1), an IAB donor node 2 (gNB 2), an IAB node 1-1, an IAB node 1-2, an IAB node 2-1, an IAB node 2-2, and an IAB node 3. In the wireless communication system, a UE may establish RRC connection by accessing the IAB node 3, and may transmit and receive data. The UE may be connected to the IAB node 3 via a wireless access link. In an embodiment, the UE may be referred to as a node. Here, the UE functions as a lower node (child node) of the IAB node 3, and the IAB node 3 functions as an upper node (parent node) of the UE.

Referring to FIG. 2D, the IAB node 3 may be connected to the gNB 1 via the IAB node 1-1 and the IAB node 1-2. The IAB node 3 may be connected to the IAB node 1-1 via a wireless backhaul (BH) link. The IAB node 1-1 may be connected to the IAB node 1-2 via a wireless BH link. Here, the IAB node 1-1 functions as a child node of the IAB node 1-2, and the IAB node 1-2 functions as a parent node of the IAB node 1-1. The IAB node 1-2 may be connected to the gNB 1 (the IAB donor node 1) via a wireless BH link. Here, the IAB node 1-2 functions as a child node of the gNB 1, and the gNB 1 functions as a parent node of the IAB node 1-2. Route A that passes the IAB node 1-1 and the IAB node 1-2 may be configured between the IAB node 3 and the gNB 1.

In the present disclosure, F1* and F1 may be interchangeably used, and may indicate an NR backhaul link used in backhauling between an IAB node and an IAB donor. Also, F1* may indicate F1*-C or F1*-U. The IAB node may host a DU function and a mobile termination (MT) function, and a wireless interface between the IAB node and the gNB (IAB donor node) may be F1* interface or F1* connection which is similar to F1 interface connecting a CU and a DU. Referring to FIG. 2D, F1* connection may be established between the IAB node 3 and the gNB 1, and more particularly, F1*-C connection may be established between a DU of the IAB node 3 and a CU-control plane (CP) of the gNB 1, and F1*-U1 connection may be established between the DU of the IAB node 3 and a CU-user plane (UP) of the gNB 1.

In an embodiment, the IAB node 3 may have mobility, and may perform inter-CU handover to other gNB. For example, the IAB node 3 may release connection to the IAB node 1-1 that is a lower node of the gNB 1, and may establish connection to the IAB node 2-1 that is a lower node of the gNB 2. A control of handover of an IAB node may be performed via a gNB-CU. For example, for handover of the IAB node, a control signal of the IAB node and connected lower nodes may be transmitted to the gNB-CU.

When a particular IAB node performs inter-CU handover to other gNB-CU in multi-hop IAB architecture, the corresponding IAB node disconnects connection to a connected serving gNB-CU, and performs handover to a new target gNB-CU. Here, if the connection to the old serving gNB-CU (i.e., source serving gNB-CU) is disconnected without consideration of a service state including a wireless channel of a child node (lower node) connected to the corresponding IAB node, child nodes connected to the corresponding IAB node cannot receive a service from the connected node and have to newly perform connection to a gNB-CU. That is, after the IAB node performing handover completes connection to the target gNB-CU or other IAB node connected to the target gNB-CU, the child nodes of the IAB node performing handover have to newly perform connection to an old IAB node (i.e., source IAB node) via a random access or perform connection to other IAB node (i.e., target IAB node) via a random access.

Referring to FIG. 2D, the IAB node 3 may perform inter-CU handover from the gNB 1 to the gNB 2. In more detail, the IAB node 3 may perform inter-CU handover from the IAB node 1-1 that is a child node of the gNB 1 to the IAB node 2-1 that is a child node of the gNB 2. In this case, when the IAB node 3 releases connection to the IAB node 1-1 that is the lower node of the gNB 1, Route A that passes the IAB node 1-1 and the IAB node 1-2 between the IAB node 3 and the gNB 1 is released, and F1* connection between the IAB node 3 and the gNB 1 CU is released. Afterward, when the IAB node 3 establishes connection to the IAB node 2-1 that is the lower node of the gNB 2, Route B that passes the IAB node 2-1 and the IAB node 2-2 between the IAB node 3 and the gNB 2 is configured, and F1* connection is established between the IAB node 3 and the gNB 2 CU.

After the IAB node 3 performs handover to the gNB 2, the IAB node 3 may be connected to the gNB 2 via the IAB node 2-1 and the IAB node 2-2. The IAB node 3 may be connected to the IAB node 2-1 via a wireless BH link. The IAB node 2-1 may be connected to the IAB node 2-2 via a wireless BH link. Here, the IAB node 2-1 functions as a child node of the IAB node 2-2, and the IAB node 2-2 functions as a parent node of the IAB node 2-1. The IAB node 2-2 may be connected to the gNB 2 (IAB donor node 2) via a wireless BH link. Here, the IAB node 2-2 functions as a child node of the gNB 2, and the gNB 2 functions as a parent node of the IAB node 2-2. Contents associated with the handover technology of an IAB node may be referred to contents defined in TR 38.874.

When inter-CU handover occurs due to mobility of an IAB node, all child nodes experience disconnection from a network as new connection for the child nodes is not supported. The child nodes of the IAB node to perform inter-CU handover may receive again a service from the network after they are re-connected to the old IAB node (i.e., source IAB node) or they are connected to a new IAB node (i.e., target IAB node). Therefore, a network service quality deteriorates due to disconnection of data transceiving of the child node that experiences disconnection. Also, even when the child node of the IAB node performing inter-CU handover is re-connected to the old IAB node, the child node has to perform again a random access to the old IAB node. As the child node performing connection to the old IAB node has to perform again a random access even when a timing advance (TA) or beam alignment is not greatly changed, a time delay of new connection increases due to an inefficient operation. Moreover, the IAB node and all lower nodes (child nodes) which complete connection to a new gNB-CU have to perform again an entire RRC re-establishment procedure. That is, due to handover of an upper IAB node, all child nodes cannot receive a network service for a long delay time even when they do not need handover, and thus, a network service quality may deteriorate.

According to an inter-CU handover method of an IAB node proposed in the present disclosure, when an IAB node performs inter-CU handover, mobility of a child node may be managed by efficient signaling, and a delay time until a network service is supported again to the child node may be decreased.

According to the present disclosure, a first gNB-CU pre-provides information about handover of an IAB node to lower nodes of the IAB node to perform handover. Afterward, according to context information of each of the lower nodes, it is distinguished between a lower node to maintain connection to the IAB node to perform handover and a lower node to perform connection to a new IAB node. According to the present disclosure, a service delay time in which a lower node of the IAB node to perform handover cannot be serviced may be decreased, and new connection therefor may be supported fast. Also, according to the present disclosure, RRC re-establishment of lower nodes connected to an IAB node to perform handover may be collectively performed to reduce unnecessary control signaling. Hereinafter, with reference to FIGS. 3 to 8, an inter-CU handover method of an IAB node will now be described in detail, such that, when a network service is supported to a lower node in IAB architecture proposed in the present disclosure, a delay time may be decreased.

Figure 3:
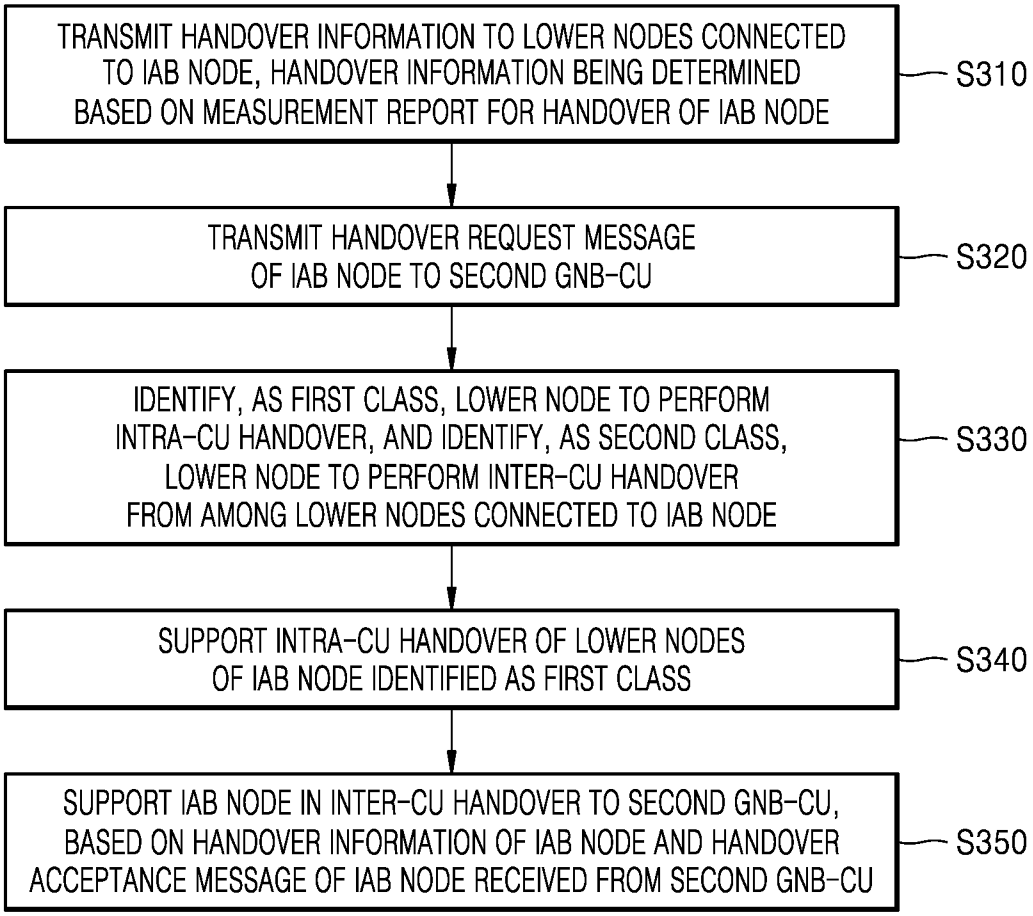
FIG. 3 is a flowchart for describing an operation in which a first gNodeB (gNB)-CU supports an IAB node in handover to a second gNB-CU, according to an embodiment of the present disclosure.

FIG. 3 is a flowchart for describing an operation in which a first gNB-CU supports an IAB node in handover to a second gNB-CU, according to an embodiment of the present disclosure.

In an embodiment, the IAB node may have been connected to the first gNB-CU and then may perform handover to the second gNB-CU. In the present disclosure, the expression "connection to the first gNB-CU" includes not only a case of direct connection to the first gNB-CU but also includes a case of indirection connection to the first gNB-CU via connection to other IAB node connected to the first gNB-CU. Equally, the expression "handover to the second gNB-CU" includes not only a case of direct handover to the second gNB-CU but also includes a case of indirect handover to the second gNB-CU via handover to other IAB node connected to the second gNB-CU.

In the present disclosure, other IAB node or a UE may be connected to an IAB node that performs inter-CU handover. In FIGS. 1 and 2A to 2D, a lower node (lower IAB node) and a UE are distinguished therebetween, however, in FIGS. 3 to 9E below, for convenience of descriptions, it is described that a 'lower node' of a particular IAB includes other IAB node and a UE. That is, in embodiments to be described below, a 'lower node' connected to an IAB node may indicate other IAB node or the UE.

In operation S310, the first gNB-CU transmits handover information to lower nodes connected to an IAB node, the handover information being determined based on a measurement report for handover of the IAB node. The measurement report for handover of the IAB node may include information associated with a communication characteristic of the IAB node or a lower node connected to the IAB node. The IAB node may transmit the measurement report when an exact occasion defined in a network (e.g., the first gNB-CU and a child node thereof) occurs. According to the occasions, the measurement report may be periodically transmitted, or may be transmitted based on occurrence of an event. For example, the IAB node for which channel is changed due to mobility may measure and report a signal-to-interference and noise ratio (SINB) with respect to electric waves transmitted from a parent node belonging to the first gNB-CU.

For example, the first gNB-CU may transmit the handover information to at least one lower node (or UE) connected to the IAB node that performs inter-CU handover. The handover information may be determined based on the measurement report for handover of the IAB node that performs inter-CU handover. For example, the handover information may include context information of the IAB node, channel state information, a handover performing time, or the like. The channel state information may include a rank indicator (RI), a precoding matrix indicator (PMI), and a channel quality indicator (CQI). The context information may include a UE identifier, security key information, valid duration of the context information, or the like.

In operation S320, the first gNB-CU transmits a handover request message of the IAB node to a second gNB-CU. In an embodiment, the second gNB-CU having received the handover request message may request lower IAB nodes thereof for context setup for the IAB node to perform handover. Afterward, the second gNB-CU may transmit a handover acceptance message for the IAB node to the first gNB-CU, in response to the handover request message of the IAB node received from the first gNB-CU.

In operation S330, the first gNB-CU identifies, as a first class, a lower node to perform intra-CU handover from among lower nodes connected to the IAB node, and identifies, as a second class, a lower node to perform inter-CU handover. In more detail, the first gNB-CU may receive context information from at least one lower node of the IAB node, and may classify a class of the at least one lower node, based on the received context information. In an embodiment, a class of lower nodes may be determined, based on a proximity of each lower class, or a reference signal received power (RSRP)/reference signal received quality (RSRQ) data history.

The at least one lower node of the IAB node may be classified into the first class or the second class.

A lower node of the first class indicates a lower node to perform intra-CU handover to other IAB node connected to the first gNB-CU, from among nodes connected to the IAB node before the IAB node performs inter-CU handover. For example, the lower node of the first class may have a better channel state with other IAB nodes connected to the first gNB-CU, compared to a channel state with the IAB node to which the lower node is currently connected. Therefore, the first gNB-CU may not support that the lower node of the first class performs inter-CU handover to the second gNB-CU according to the currently-connected IAB node but may determine the lower node of the first class to attempt intra-CU handover to other IAB node connected to the first gNB-CU.

In operation S340, the first gNB-CU supports the lower node of the first class to perform intra-CU handover to other IAB node connected to the first gNB-CU, before the IAB performs handover to the second gNB-CU. For example, based on the measurement report transmitted by the lower node of the first class, the first gNB-CU determines an IAB node to be a target IAB node of intra-CU handover, the IAB node having a better channel state with the lower node from among IAB nodes connected to the first gNB-CU. Afterward, the first gNB-CU completes UE context setup between the target IAB node and the corresponding lower node, and allocates a random access preamble to the corresponding lower node. The lower node that belongs to the first class performs intra-CU handover to the target IAB node via a random access.

In an embodiment, there is no lower node identified as the first class from among lower nodes of the IAB node to perform inter-CU handover. In this case, in operation S340, an operation in which a lower node performs intra-CU handover may be skipped. That is, in an embodiment, an inter-CU handover procedure of the IAB node may be performed as an operation of performing inter-CU handover of the IAB node immediately after an operation of identifying a class of lower nodes connected to the IAB node.

A lower node of the second class indicates a lower node to perform inter-CU handover from among nodes connected to the IAB node before the IAB performs inter-CU handover. For example, the lower node of the second class may perform inter-CU handover to the second gNB-CU along with the IAB node, by maintaining connection to the IAB node while the IAB node performs inter-CU handover. For example, lower nodes of the second class may be nodes that are physically close to the IAB node to which they are currently connected. In a case where the lower node of the second class maintains a close distance to the current IAB node, the lower node may maintain a best channel by receiving a network service while maintaining an access to the current IAB node. Therefore, the lower node of the second class operates a timer while maintaining connection to the IAB node during an inter-CU handover procedure of the IAB node, and waits for control signaling from a new gNB-CU (the second gNB-CU) until the timer expires.

In operation S350, the first gNB-CU supports the IAB node in inter-CU handover to the second gNB-CU, based on the handover information of the IAB node and the handover acceptance message of the IAB node received from the second gNB-CU. In more detail, the first gNB-CU may receive handover acceptance message of the IAB node from the second gNB-CU, may perform intra-CU handover of lower nodes to other IAB nodes connected to the first gNB-CU, the lower nodes (lower layer nodes) being identified as the first class, and then may perform inter-CU handover of an IAB node to the second gNB-CU, the IAB node maintaining connection to its lower nodes identified as the second class.

Figure 4:
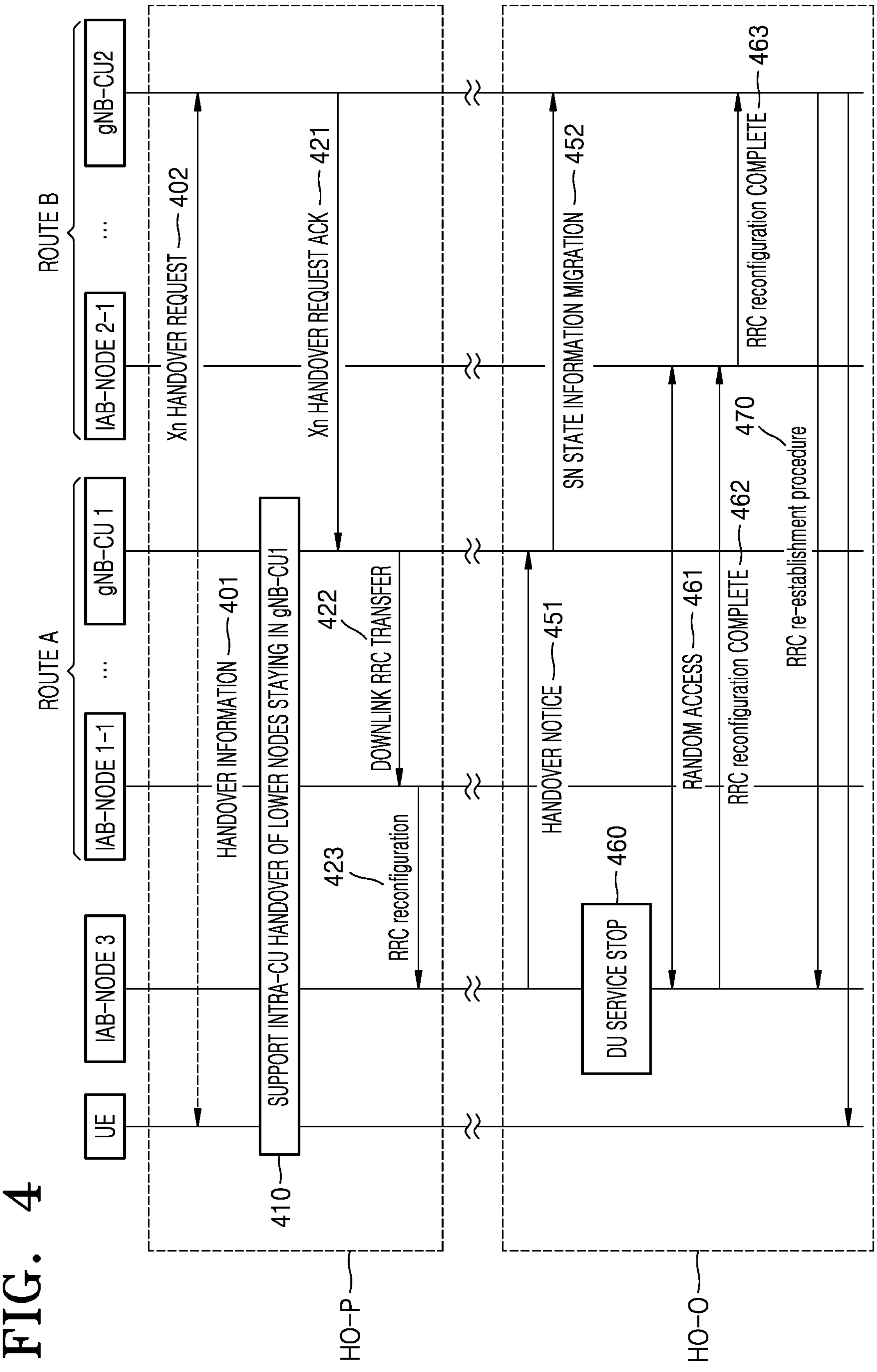
FIG. 4 is a diagram for describing operations of a BS, radio nodes, and an UE in an inter-CU handover procedure of an IAB-node, according to an embodiment of the present disclosure.

FIG. 4 is a diagram for describing operations of BSs (a gNB-CU 1 and a gNB-CU 2), radio nodes (an IAB-node 1-1 and an IAB-node 2-1), and an UE in an inter-CU handover procedure of an IAB-node 3, according to an embodiment of the present disclosure.

In an embodiment, the IAB-node 3 may have been connected to the gNB-CU 1 via the IAB-node 1-1 and then may perform handover to the IAB-node 2-1 connected to the gNB-CU 2. Referring to FIG. 4, a lower node connected to the IAB-node 3 to perform inter-CU handover is indicated as the UE, but the present disclosure is not limited thereto, and the lower node may be other IAB node.

Referring to FIG. 4, the inter-CU handover procedure of the IAB-node 3 may include a handover preparation procedure (HO-P) and a handover performance procedure (HO-O).

The handover preparation procedure (HO-P) may include an operation (410) in which, before the IAB-node 3 releases (460) the connection to the gNB-CU 1, the gNB-CU 1 supports intra-CU handover of lower nodes to other IAB node connected to the gNB-CU 1, the lower nodes being identified as the first class, and an operation in which the gNB-CU 1 indirectly receives, from the gNB-CU 2, a handover acceptance message 421 of an IAB node, in response to a handover request message 402 of the IAB node. That is, the handover preparation procedure (HO-P) may include pre-setting operations including monitoring, signaling, acceptance, or the like to perform inter-CU handover.

In more detail, the handover preparation procedure (HO-P) may include an operation (401) of transmitting, by the gNB-CU 1, handover information of the IAB-node 3 to child nodes, an operation of transmitting, by the gNB-CU 1, a handover request message 402 of the IAB-node 3 to the gNB-CU 2, an operation of supporting, by the gNB-CU 1 and the IAB-node 3, intra-CU handover of a child node (the UE) identified as the first class, and an operation of transmitting, by the gNB-CU 2, a handover acceptance message 421 to the gNB-CU 1, in response to the handover request message 402 of the IAB-node.

The handover performance procedure (HO-O) includes operations in which the IAB-node 3 actually performs inter-CU handover after pre-setting for inter-CU handover is completed.

Referring to FIG. 4, the handover performance procedure (HO-O) may include an operation (451) of notifying, by the IAB-node 3, the gNB-CU 1 of handover when performing inter-CU handover, an operation (452) of transferring, by the gNB-CU 1, SN state information to the gNB-CU 2, an operation (460) of releasing, by the IAB-node 3, connection to the gNB-CU 1, an operation (461) of random-accessing, by the IAB-node 3, the lower IAB-node 2-1 connected to the gNB-CU 2, and an operation (470) of re-establishing, by the gNB-CU 2, RRC connection to the IAB-node 3 and lower nodes (UE) connected to the IAB-node 3.

According to an embodiment of the present disclosure, lower nodes (the UE) of the IAB-node 3 may not perform a separate random access procedure after inter-CU handover of the IAB-node 3. Instead, the IAB-node 3 that is an upper node transfers RRC configuration information to a connected lower node after inter-CU handover. By doing so, while the IAB-node 3 performs handover, a random access procedure of lower nodes maintaining connection to the IAB-node 3 may be skipped, and RRC connection re-establishment procedures for all lower nodes that are connected to the IAB-node 3 and thus are handed over together with the IAB-node 3 may be performed in an aggregation manner, so that more efficient control signaling may be possible.

Figure 5:
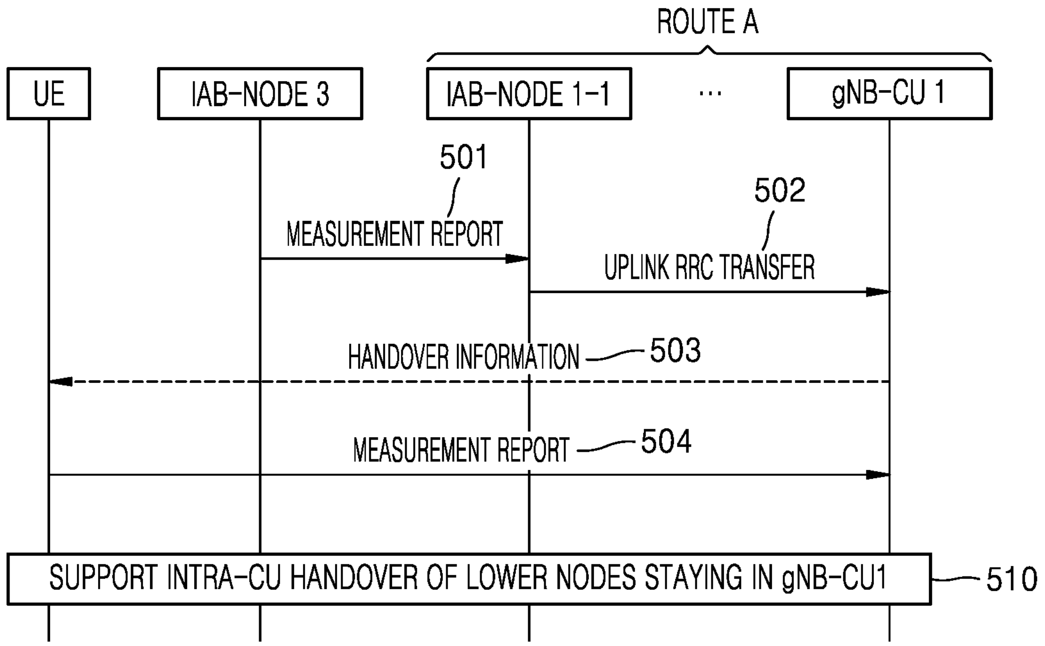
FIG. 5 is a diagram for describing an operation in which a lower node transmits context information, in response to receiving of handover information of an upper node, according to an embodiment of the present disclosure.
Figure 6:
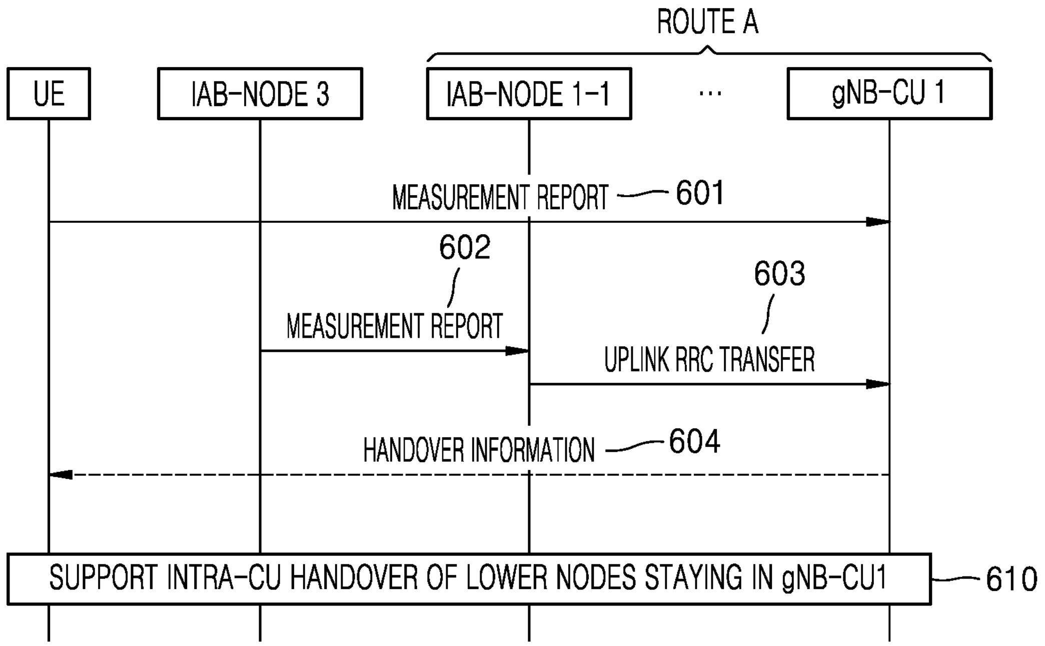
FIG. 6 is a diagram for describing an operation in which a lower node transmits context information when the lower node detects channel state change, according to an embodiment of the present disclosure.

FIGS. 5 and 6 are diagrams for describing a time at which a lower node (UE) actively transmits context information to maintain connection, according to an embodiment of the present disclosure.

Referring to FIG. 5, when the lower node (UE) receives (503), from a gNB-CU 1, handover information of an upper node (IAB-node 3) to which the lower node (UE) is connected, the lower node (UE) may transmit (504) context information (or a measurement report), in response thereto. In this case, recent channel state information immediately before handover may be included in the context, so that accuracy of lower node classification using the context information may be increased. Operation 501 of FIG. 5 may correspond to operation 701 of FIG. 7 which is to be described below. Operation 502 of FIG. 5 may correspond to operation 702 of FIG. 7 which is to be described below. Operation 510 of FIG. 5 may correspond to operation 410 of FIG. 4 which is described above.

Referring to FIG. 6, when a lower node (UE) detects a channel state change, regardless of whether the lower node (UE) receives, from a gNB-CU 1, handover information of an upper node (IAB-node 3) to which the lower node (UE) is connected, the lower node (UE) may transmit (601) context information (or a measurement report), or may transmit (601) the context information (or the measurement report) at preset time intervals. For example, a case in which reference signal received power (RSRP) is changed by a preset threshold or more may be included in a case in which the channel state change is triggered, and may correspond to the case in which the channel state change is detected. In this case, as the lower node actively transfers the context information, the gNB-CU 1 may classify a class of the lower node by using pre-exchanged context information, without additional exchange of a message with the lower node (UE) at a time of handover. Operation 602 of FIG. 6 may correspond to operation 701 of FIG. 7 which is to be described below. Operation 603 of FIG. 6 may correspond to operation 702 of FIG. 7 which is to be described below. Operation 610 of FIG. 6 may correspond to operation 410 of FIG. 4 which is described above.

In an embodiment, the lower node (UE) of the IAB-node 3 to perform inter-CU handover may transmit the context information (or the measurement report) to the gNB-CU 1 via the IAB-node 3. When the lower node (UE) of the IAB-node 3 transmits the context information (or the measurement report) to the IAB-node 3, the IAB-node 3 may identify a class of lower nodes, and may transmit the received context information (or the measurement report) of the lower node (UE) to the gNB-CU 1 so as to control handover of the lower nodes.

Figure 7:
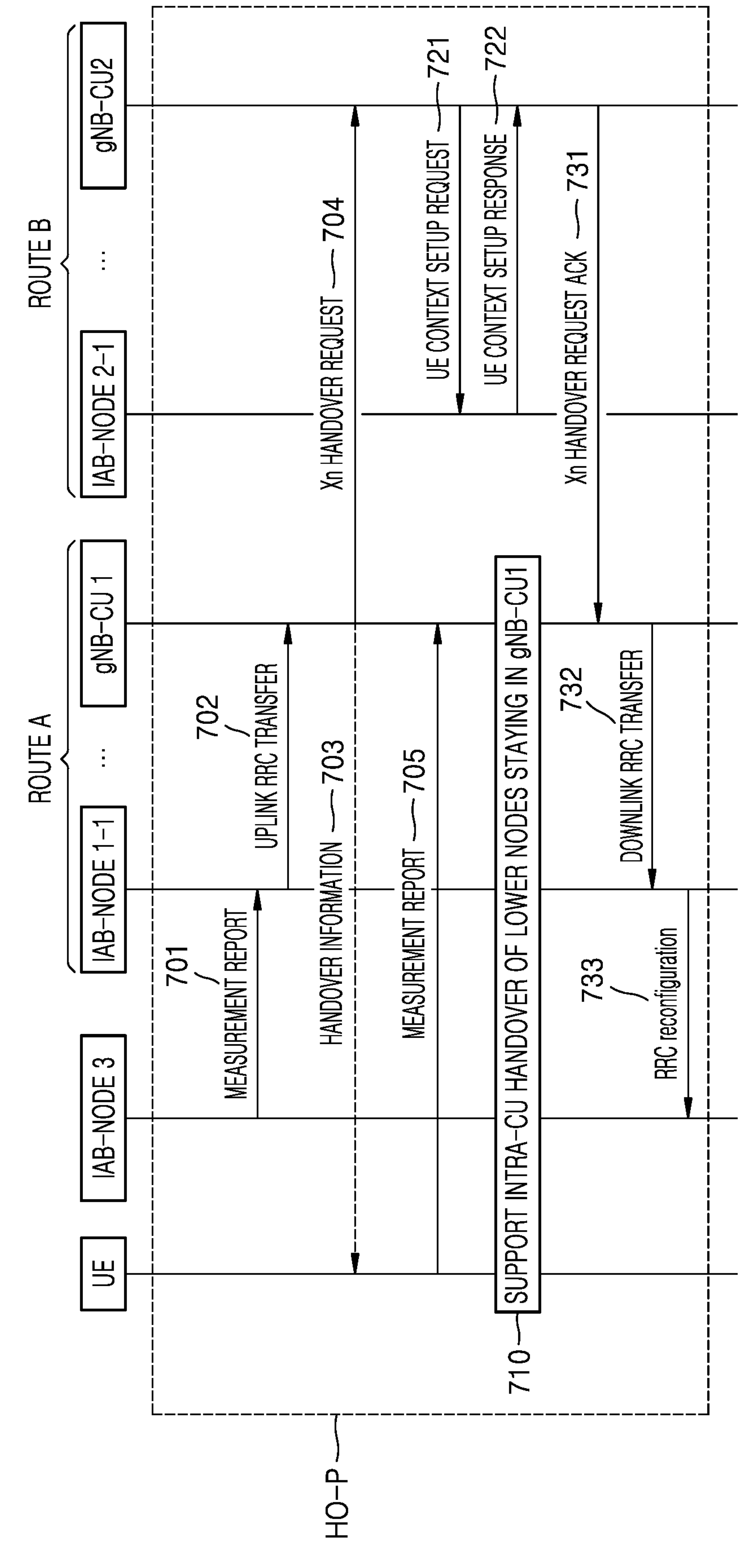
FIG. 7 is a diagram for describing operations of a BS, radio nodes, and a UE, in an inter-CU handover preparation procedure of an IAB node, according to an embodiment of the present disclosure.

FIG. 7 is a diagram for describing operations of BSs (gNB-CU 1, gNB-CU 2), radio nodes (IAB-node 1-1, IAB-node 2-1), and a UE, in an inter-CU handover preparation procedure (HO-P) of an IAB node (IAB-node 3), according to an embodiment of the present disclosure.

The handover preparation procedure (HO-P) of FIG. 7 may correspond to the afore-described handover preparation procedure (HO-P) of FIG. 4 and an operation of transmitting, the lower node (UE), context information in FIGS. 5 to 6. In more detail, operation 703 of FIG. 7 may correspond to operation 401 of FIG. 4. Operation 704 of FIG. 7 may correspond to operation 402 of FIG. 4. Operation 705 of FIG. 7 may correspond to operation 504 of FIG. 5 or operation 601 of FIG. 6. Operation 710 of FIG. 7 may correspond to operation 410 of FIG. 4. Operation 731 of FIG. 7 may correspond to operation 421 of FIG. 4. Operation 732 of FIG. 7 may correspond to operation 422 of FIG. 4. Operation 733 of FIG. 7 may correspond to operation 423 of FIG. 4.

Referring to operation 701, the inter-CU handover preparation procedure (HO-P) of the IAB-node 3 may include an operation of transmitting, by the IAB-node 3 to perform inter-CU handover, a measurement report for handover to a connected upper node (IAB-node 1-1).

Referring to operation 702, the IAB-node 1-1 may transmit the measurement report received from the IAB-node 3 to the gNB-CU 1 via UL RRC transfer. The measurement report for handover which is transmitted to the gNB-CU 1 via operation 701 and operation 702 may be used by the gNB-CU 1 to determine handover information to be transmitted to lower nodes (UE) connected to the IAB-node 3 in operation 703.

Referring to operation 721, a gNB-CU 2 received a handover request message of an IAB node from the gNB-CU 1 in operation 704 may request lower IAB nodes (IAB-node 2-1) thereof for context setup for the IAB node to perform handover. Afterward, in operation 722, the lower IAB nodes (IAB-node 2-1) may transmit a context setup completion message (context setup response) to the gNB-CU 2.

Figure 8:
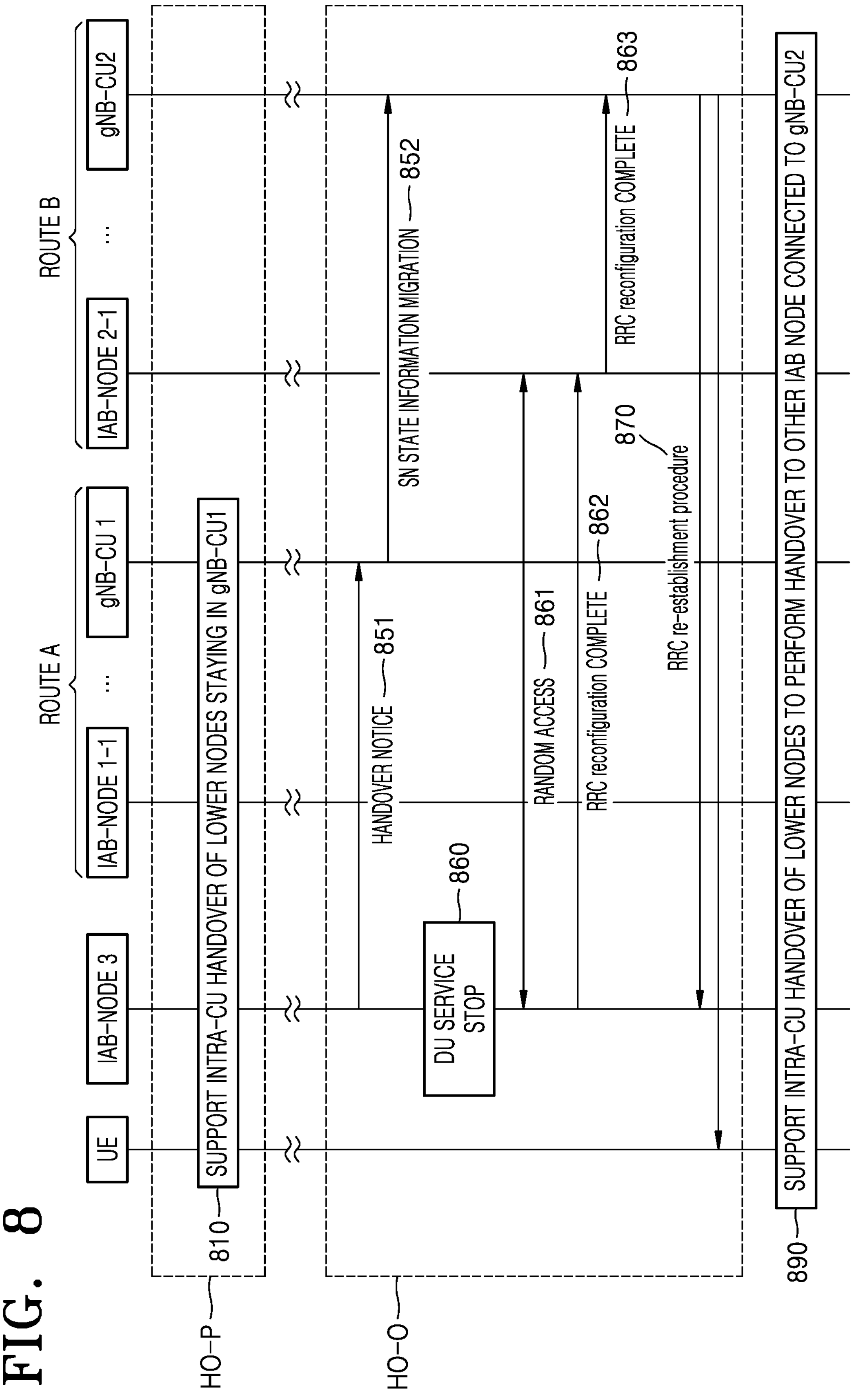
FIG. 8 is a diagram for describing operations of a BS, radio nodes, and a UE, after inter-CU handover of an IAB node is performed, according to an embodiment of the present disclosure.

FIG. 8 is a diagram for describing operations of BSs (gNB-CU 1, gNB-CU 2), radio nodes (IAB-node 1-1, IAB-node 2-1), and a UE, after inter-CU handover of an IAB node is performed, according to an embodiment of the present disclosure.

A handover preparation procedure (HO-P) of FIG. 8 may correspond to the handover preparation procedure (HO-P) of FIG. 4 or 7, and a handover performance procedure (HO-O) of FIG. 8 may correspond to the afore-described handover performance procedure (HO-O) of FIG. 5.

Referring to FIG. 8, after inter-CU handover of an IAB node (IAB-node 3) is performed, the gNB-CU 2 may identify some of lower nodes of the IAB-node 3 as a third class, and may support the lower node identified as the third class in intra-CU handover to other child node connected to the gNB-CU 2, not to the IAB-node 3 connected to the gNB-CU 2 (see operation 890).

The lower node of the third class indicates a lower node to perform intra-CU handover to other IAB node connected to the gNB-CU 2, after inter-CU handover is performed. For example, a lower node (UE) that maintains a good channel state with a directly-connected IAB node (IAB-node 3) but is not satisfied with respect to QoS requirement by the gNB-CU 2 newly connected via the IAB-node 3 may be identified as the third class. Also, the lower node (UE) that cannot be supported by a newly-connected upper IAB node (IAB-node 2-1) may be identified as the third class.

In an embodiment, a lower node that is from among lower nodes of the IAB-node 3 and has not received a control signal for RRC re-establishment until a preset timer expires may be identified as the third class. In an embodiment, the gNB-CU 2 may receive context information from at least one lower node connected to the IAB-node 3, and may identify, as the third class, nodes to perform intra-CU handover to other lower node of the gNB-CU 2 from among at least one lower node, based on the received context information.

In operation 890, the gNB-CU 2 may support the lower node (UE) identified as the third class to perform intra-CU handover to other IAB node connected to the gNB-CU 2.

FIGS. 9A to 9E are diagrams for describing a connection relation among a gNB, radio nodes, and a UE in each step, in an inter-CU handover procedure of an IAB node, according to an embodiment of the present disclosure.

Figure 9A:
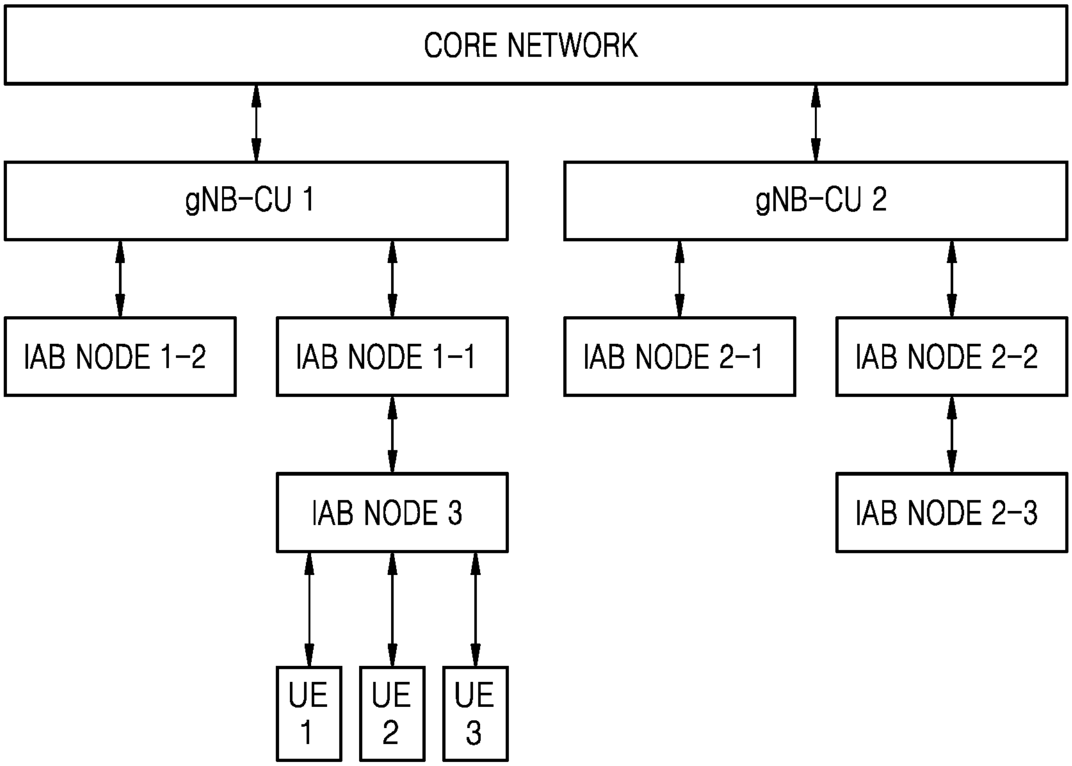
FIG. 9A is diagram for describing a connection relation among a gNB, radio nodes, and a UE in each step, in an inter-CU handover procedure of an IAB node, according to an embodiment of the present disclosure.

Referring to FIG. 9A, before an IAB node 3 performs inter-CU handover from a gNB-CU 1 to a gNB-CU 2, the IAB node 3 may have been connected to the gNB-CU 1 via an IAB node 1-1. Also, a UE 1 identified as a first class, a UE 2 identified as a second class, and a UE 3 identified as a third class may have been connected as lower nodes to the IAB node 3. In a present embodiment, a method of identifying, by the gNB-CU 1, a class of a lower node may correspond to the method described above with reference to FIGS. 3 to 8.

Figure 9B:
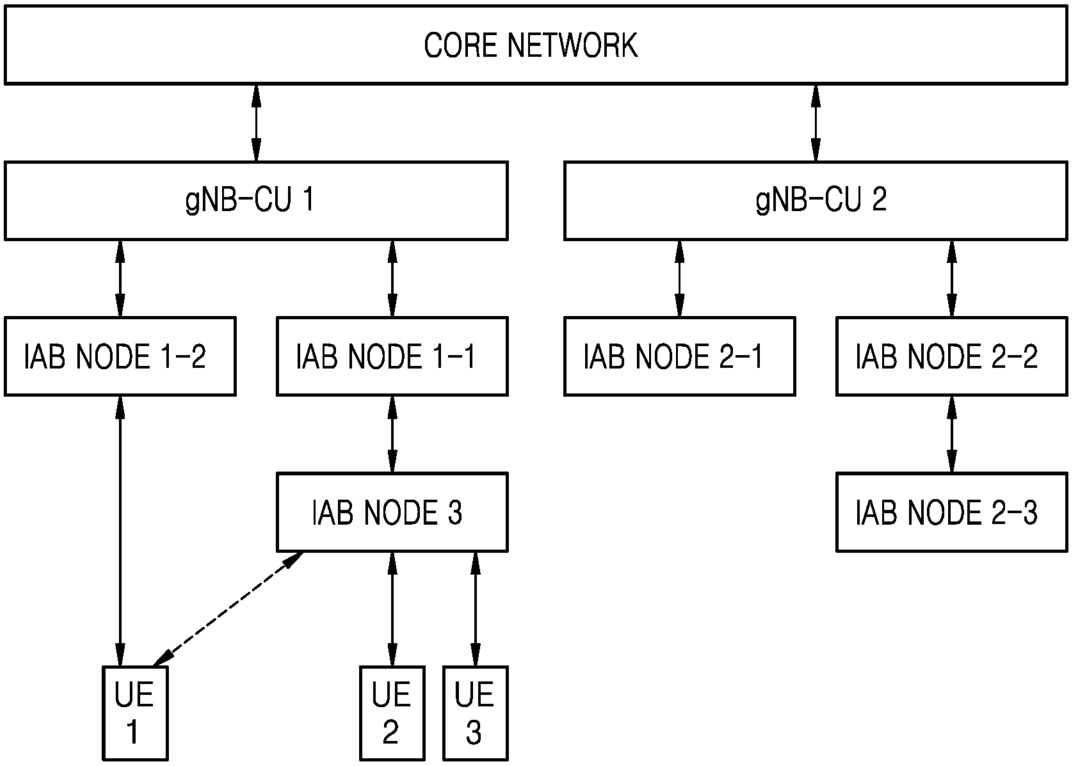
FIG. 9B is diagram for describing a connection relation among a gNB, radio nodes, and a UE in each step, in an inter-CU handover procedure of an IAB node, according to an embodiment of the present disclosure.

Referring to FIG. 9B, before the IAB node 3 performs inter-CU handover, the gNB-CU 1 may allow the UE 1 identified as the first class to perform intra-CU handover to other IAB node (IAB node 1-2) connected to the gNB-CU 1. For example, the gNB-CU 1 may support the UE 1 identified as the first class to perform intra-CU handover from the IAB node 3 to the IAB node 1-2.

Figure 9C:
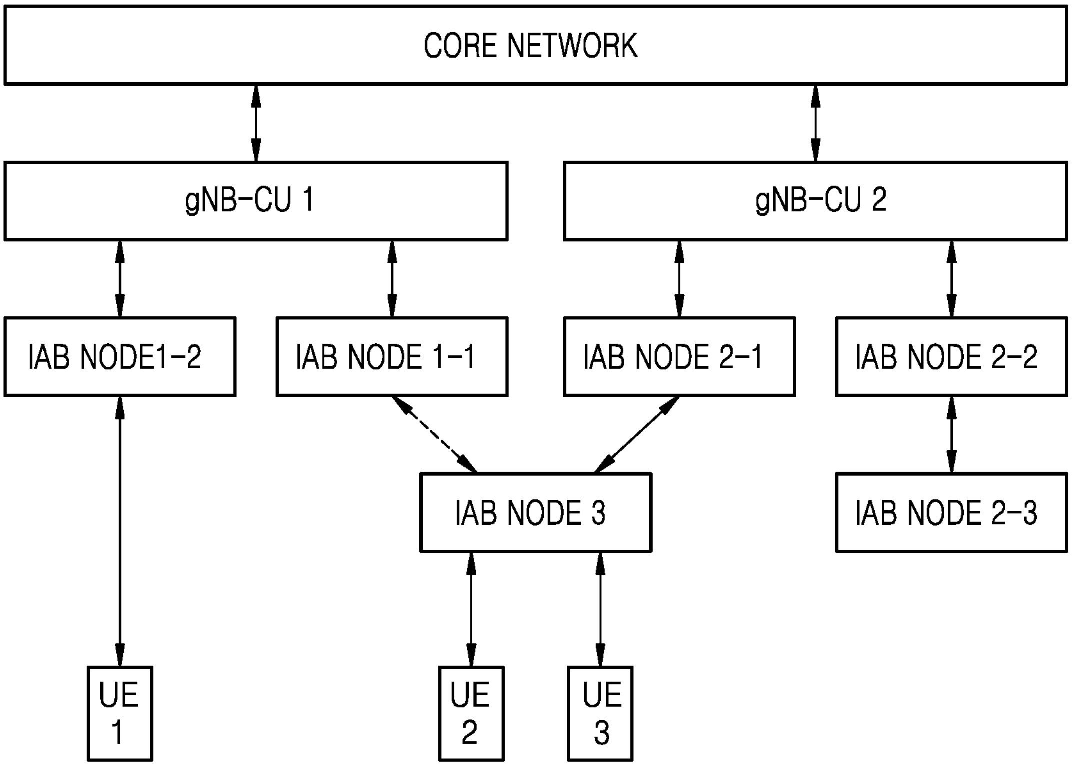
FIG. 9C is diagram for describing a connection relation among a gNB, radio nodes, and a UE in each step, in an inter-CU handover procedure of an IAB node, according to an embodiment of the present disclosure.

Referring to FIG. 9C, after the UE 1 identified as the first class performs intra-CU handover, the IAB node 3 that maintains connection to the UE 2 of the second class and the UE 3 of the third class may perform inter-CU handover to an IAB node 2-1 connected to the gNB-CU 2. For example, the gNB-CU 1 may support the IAB node 3 to perform inter-CU handover from the IAB node 1-1 to the IAB node 2-1.

Figure 9D:
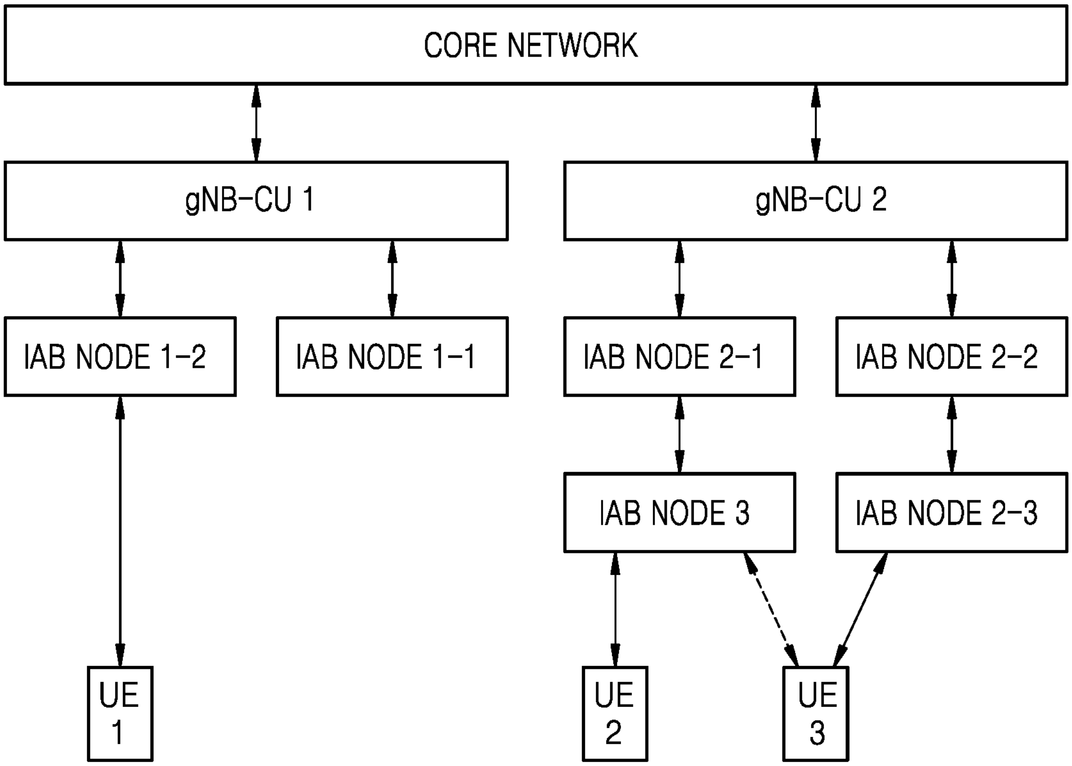
FIG. 9D is diagram for describing a connection relation among a gNB, radio nodes, and a UE in each step, in an inter-CU handover procedure of an IAB node, according to an embodiment of the present disclosure.
Figure 9E:
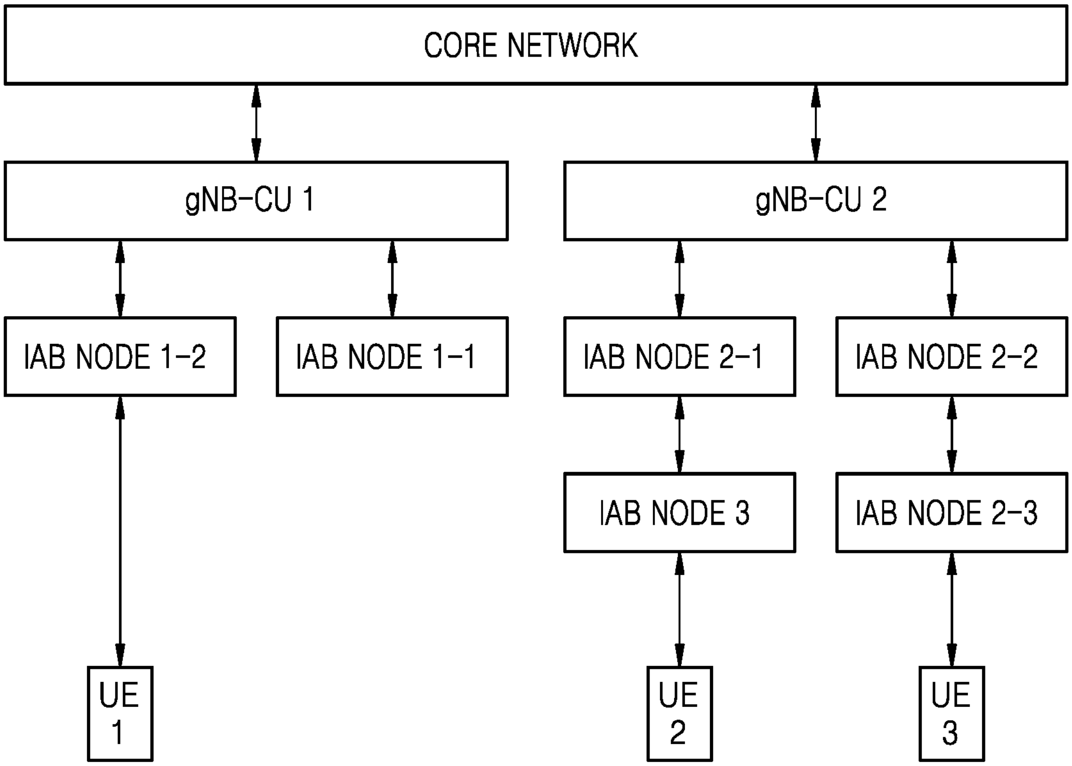
FIG. 9E is diagram for describing a connection relation among a gNB, radio nodes, and a UE in each step, in an inter-CU handover procedure of an IAB node, according to an embodiment of the present disclosure.

Referring to FIGS. 9D and 9E, after the IAB node 3 performs inter-CU handover, the gNB-CU 2 may identify a class of lower nodes, based on handover information of the lower nodes. The gNB-CU 2 may allow the UE 3 identified as the third class to perform intra-CU handover to other IAB node (IAB node 2-3) connected to the gNB-CU 2. For example, the gNB-CU 2 may support the UE 3 identified as the third class to perform intra-CU handover from the IAB node 3 to the IAB node 2-3.

Referring to FIGS. 9A to 9E, by classifying classes of lower nodes connected to the IAB node 3 to perform inter-CU handover, mobility of the lower nodes may be managed. In particular, the gNB-CU 1 may set a timer to the UE 2 and the UE 3 which maintain connection to the IAB node 3 while the IAB node 3 performs inter-CU handover. Until the set timer expires, the UE 2 and the UE 3 do not determine an RLF state and do not perform a random access procedure even when RRC control signaling is not received. In an embodiment, a start point of the timer may be determined based on a time of inter-CU handover of the IAB node 3. Information about the time of inter-CU handover of the IAB node 3 may be included in handover information transferred to the lower nodes connected to the IAB node 3.

For example, a lower node as the UE 2 which has received RRC control signaling before the set timer expires may perform connection to a new gNB-CU 2 without a random access procedure (RACH-less). When the IAB node 3 that is an upper node maintaining connection with the UE 2 performs an RRC reconfiguration procedure with respect to itself, the IAB node 3 may also perform an RRC reconfiguration procedure for the UE 2 that is the lower node. Therefore, the UE 2 that performs connection to the new gNB-CU 2 without the random access procedure (RACH-less) may update context information via grouped RRC reconfiguration, without re-performing a time synchronization or beam alignment procedure.

A lower node as the UE 3 which has not received RRC control signaling until the set timer expires may determine that it drops from admission control and thus may perform a random access to lower nodes of the gNB-CU 2 immediately after expiry of the timer. In a case of the UE 3, a control signal link between the IAB node 3 and the UE 3 may be maintained until intra-CU handover is performed. For example, referring back to FIG. 9D, a path may be established between the gNB-CU 2 and the UE 3 via the IAB node 3, and a control signal link may be formed in the path. Therefore, the gNB-CU 2 may transmit a control signal to the UE 3 via the IAB node 3, and may support the UE 3 to perform intra-CU handover to other IAB node connected to the gNB-CU 2.

That is, in an inter-CU handover procedure of an IAB node according to an embodiment of the present disclosure, the gNB-CU 1 pre-transfers handover information to all lower nodes connected to the IAB node to perform handover. As the handover information is pre-transferred to all lower nodes, even when the lower nodes may not be able to receive a network service from the connected IAB node for an instant period of time, the lower nodes wait for network service re-access until expiry of a timer set to a time at which the IAB node completes handover. If a lower node does not receive control signaling for RRC re-establishment until the timer expires, the lower node may determine that it is an RLF state and may perform a random access to a new IAB node.

In an embodiment of the present disclosure, an IAB node that has performed inter-CU handover may maintain a link on which the IAB node can transmit control signaling to the lower node with a lower node which must perform intra-CU handover to another IAB node until the lower node is connected to the other IAB node, but may not perform data transmission. As data transmission is not performed, a radio resource used for the corresponding lower node may be minimized and control signaling of a gNB-CU may be transmitted to allow the corresponding lower node to be connected to the other IAB node.

Figure 10:
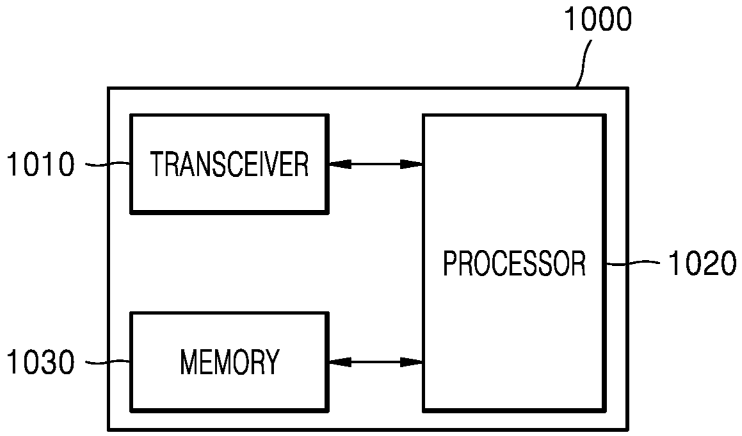
FIG. 10 is a block diagram schematically illustrating a configuration of a gNB-CU, according to an embodiment of the present disclosure.

FIG. 10 is a block diagram schematically illustrating a configuration of a gNB 1000 including a CU and a DU, according to an embodiment of the present disclosure.

Referring to FIG. 10, the gNB 1000 may include a transceiver 1010, a processor 1020, and a memory 1030. According to the communication method of the gNB 1000, the transceiver 1010, the processor 1020, and the memory 1030 of the gNB 1000 may operate. However, elements of the gNB 1000 are not limited to the example above. For example, the gNB 1000 may include more elements than the aforementioned elements or may include fewer elements than the aforementioned elements. In an embodiment, the transceiver 1010, the processor 1020, and the memory 1030 may be implemented as one chip. The processor 1020 may include one or more processors.

A receiver of the gNB 1000 and a transmitter of the gNB 1000 may be collectively referred to as the transceiver 1010, and the transceiver 1010 may transmit or receive signals to or from a UE or a network entity. Signals transmitted or received to or from the UE or the network entity may include control information and data.

Also, the transceiver 1010 may perform functions for transmitting and receiving signals via a wireless channel. For example, the transceiver 1010 may receive signals via wireless channels and output the signals to the processor 1020, and may transmit signals output from the processor 1020, via wireless channels.

The memory 1030 may store programs and data necessary for operations of the gNB 1000. Also, the memory 1030 may store control information or data which are included in a signal obtained by the gNB. The memory 1030 may be implemented as a storage medium including a read only memory (ROM), a random access memory (RAM), a hard disk, a compact disc (CD)-ROM, a digital versatile disc (DVD), or the like, or any combination thereof. Alternatively, the memory 1030 may not be separately arranged but may be included in the processor 1020. The memory 1030 may be configured as a volatile memory, a non-volatile memory, or a combination of a volatile memory and a non-volatile memory. The memory 1030 may provide stored data, in response to a request by the processor 1020.

The processor 1020 may control a series of processes to allow the gNB 1000 to operate according to the aforementioned embodiments of the present disclosure. For example, the processor 1020 may receive a control signal and a data signal by using the transceiver 1010, and may process the received control signal and the received data signal. The processor 1020 may transmit the processed control signal and the processed data signal by using the transceiver 1010. Also, the processor 1020 may record data to and read data from the memory 1030. The processor 1020 may perform functions of a protocol stack which are requested by the communication rules. To this end, the processor 1020 may include at least one processor or micro-processor. In an embodiment, a part of the transceiver 1010 or the processor 1020 may be referred to as a communication processor (CP). In this case, the processor 1020 may be a general-purpose processor such as a central processing unit (CPU), an application processor (AP), a digital signal processor (DSP), or the like, a graphics-dedicated processor such as a graphics processing unit (GPU), a vision processing unit (VPU) or the like, or an AI-dedicated processor such as a neural processing unit (NPU). For example, when each of one or more processors is the AI-dedicated processor, the AI-dedicated processor may be designed to have a hardware structure specialized for processing of a particular AI model. The processor 1020 may control input data to be processed based on an AI model, the input data being derived from the received control signal and the received data signal.

In an embodiment, the processor 1020 of the first gNB-CU may be configured to transmit handover information to at least one lower node connected to the IAB node, the handover information being determined based on a measurement report for handover of the IAB node, transmit a handover request message including the handover information of the IAB node to the second gNB-CU, receive context information from the at least one lower node, based on the context information, identify, as a first class, a lower node to perform intra-CU handover from among the at least one lower node, and identifying, as a second class, a lower node to perform inter-CU handover, support intra-CU handover of the lower node identified as the first class, and support inter-CU handover of the IAB node to the second gNB-CU, based on the handover information of the IAB node and a handover acceptance message of the IAB node which is received from the second gNB-CU.

In an embodiment, the processor 1020 of the second gNB-CU may be configured to receive, from the first gNB-CU, a handover request message including handover information determined based on a measurement report for handover of the IAB node, transmit a handover acceptance message of the IAB node to the first gNB-CU, in response to the handover request message, support the IAB node in performing inter-CU handover from the first gNB-CU, and perform an RRC connection re-establishment procedure on the IAB node, and perform an RRC connection re-establishment procedure on a lower node connected to the IAB node.

Figure 11:
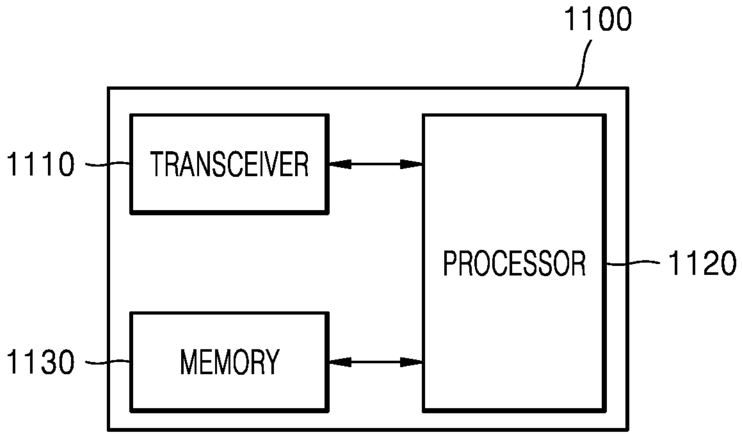
FIG. 11 is a block diagram schematically illustrating a configuration of an IAB node, according to an embodiment of the disclosure.

FIG. 11 is a block diagram schematically illustrating a configuration of an IAB node 1100, according to an embodiment of the disclosure.

Referring to FIG. 11, the IAB node 1100 may include a transceiver 1110, a processor 1120, and a memory 1130. According to the communication method of the IAB node 1100, the transceiver 1110, the processor 1120, and the memory 1130 of the IAB node 1100 may operate. However, elements of the IAB node 1100 are not limited to the example above. For example, the IAB node 1100 may include more elements than the aforementioned elements or may include fewer elements than the aforementioned elements. In an embodiment, the transceiver 1110, the processor 1120, and the memory 1130 may be implemented as one chip. The processor 1120 may include one or more processors.

A receiver of the IAB node 1100 and a transmitter of the IAB node 1100 may be collectively referred to as the transceiver 1110, and the transceiver 1110 may transmit or receive signals to or from a UE or a network entity. Signals transmitted or received to or from the UE or the network entity may include control information and data. To this end, the transceiver 1110 may include a RF transmitter for up-converting and amplifying a frequency of signals to be transmitted, and an RF receiver for low-noise-amplifying and down-converting a frequency of received signals. However, this is merely an example of the transceiver 1110, and thus elements of the transceiver 1110 are not limited to the RF transmitter and the RF receiver.

Also, the transceiver 1110 may perform functions for transmitting and receiving signals via a wireless channel. For example, the transceiver 1110 may receive signals via wireless channels and output the signals to the processor 1120, and may transmit signals output from the processor 1120, via wireless channels.

The memory 1130 may store programs and data necessary for operations of the IAB node 1100. Also, the memory 1130 may store control information or data which are included in a signal obtained by a BS The memory 1130 may be implemented as a storage medium including a ROM, a RAM, a hard disk, a CD-ROM, a DVD, or the like, or any combination thereof. Alternatively, the memory 1130 may not be separately arranged but may be included in the processor 1120. The memory 1130 may be configured as a volatile memory, a non-volatile memory, or a combination of a volatile memory and a non-volatile memory. The memory 1130 may provide stored data, in response to a request by the processor 1120.

The processor 1120 may control a series of processes to allow the IAB node 1100 to operate according to the aforementioned embodiments of the present disclosure. For example, the processor 1120 may receive a control signal and a data signal by using the transceiver 1110, and may process the received control signal and the received data signal. The processor 1120 may transmit the processed control signal and the processed data signal by using the transceiver 1110. Also, the processor 1120 may record data to and read data from the memory 1130. The processor 1120 may perform functions of a protocol stack which are requested by the communication rules. To this end, the processor 1120 may include at least one processor or microprocessor. In an embodiment, a part of the transceiver 1110 or the processor 1120 may be referred to as a CP. In this case, the processor 1120 may be a general-purpose processor such as a CPU, an AP, a DSP, or the like, a graphics-dedicated processor such as a GPU, a VPU or the like, or an AI-dedicated processor such as a NPU. For example, when each of one or more processors is the AI-dedicated processor, the AI-dedicated processor may be designed to have a hardware structure specialized for processing of a particular AI model. The processor 1120 may control input data to be processed based on an AI model, the input data being derived from the received control signal and the received data signal.

In an embodiment, the processor 1120 of the IAB node 1100 may be configured to transmit a measurement report for handover to the first gNB-CU, identify, as a first class, a lower node to perform intra-CU handover from among at least one connected lower node, and identify, as a second class, at least one lower node to perform inter-CU handover, support intra-CU handover of the lower node identified as the first class, receive a handover acceptance message from the second gNB-CU via the first gNB-CU, and perform, based on the handover acceptance message, handover from the first gNB-CU to the second gNB-CU.

In an embodiment, the IAB node 1100 may maintain its connection to the at least one lower node identified as the second class while the IAB node 1100 performs handover from the first gNB-CU to the second gNB-CU. In an embodiment, the processor 1120 of the IAB node 1100 may be configured to identify, from among the at least one lower node identified as the second class, a lower node as a third class, the lower node not having received a control signal for RRC connection re-establishment until expiry of a preset timer, and support transmission and reception of control signals to support intra-CU handover of the lower node identified as the third class. In an embodiment, the processor 1120 of the IAB node 1100 may be further configured to transmit a control signal for intra-CU handover to the lower node identified as the third class. In an embodiment, the processor 1120 of the IAB node 1100 may be configured to receive context information from the at least one lower node identified as the second class, identify, based on the context information, as a third class, a lower node to perform intra-CU handover from among the at least one lower node identified as the second class, and support intra-CU handover of the lower node identified as the third class.

Figure 12:
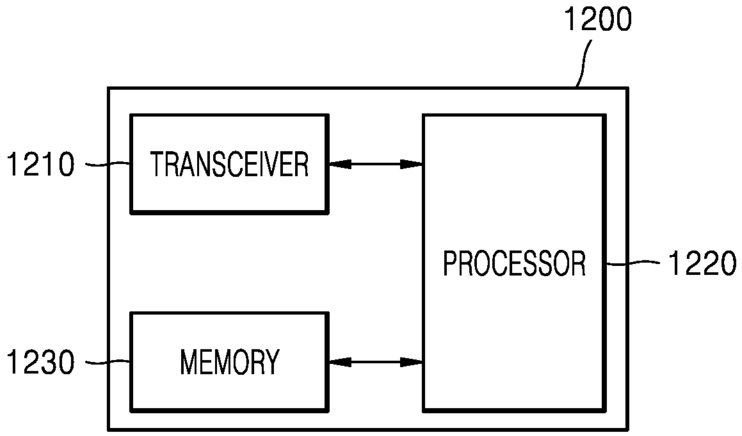
FIG. 12 is a schematic block diagram illustrating a configuration of a UE according to an embodiment of the present disclosure.

FIG. 12 is a schematic block diagram illustrating a configuration of a UE 1200 according to an embodiment of the present disclosure.

Referring to FIG. 12, the UE 1200 according to the present disclosure may include a processor 1220, a memory 1230, and a transceiver 1210. However, elements of the UE 1200 are not limited to the example above. For example, the UE 1200 may include more elements than the aforementioned elements or may include fewer elements than the aforementioned elements. In an embodiment, the processor 1220, the memory 1230, and the transceiver 1210 may be implemented as one chip. The processor 1220 may include one or more processors.

Also, the processor 1220 may control a series of processes to allow the UE 1200 to operate according to the aforementioned embodiments of the present disclosure. For example, the processor 1220 may receive a control signal and a data signal by using the transceiver 1210, and may process the received control signal and the received data signal. Also, the processor 1220 may transmit the processed control signal and the processed data signal by using the transceiver

1210. Also, the processor 1220 may control input data to be controlled based on a predefined operation rule or an AI model which are stored in the memory 1230, the input data being derived from the received control signal and the received data signal. Also, the processor 1220 may record data to and read data from the memory 1230. The processor 1220 may perform functions of a protocol stack which are requested by the communication rules. According to an embodiment, the processor 1220 may include at least one processor. In an embodiment, a part of the transceiver 1210 or the processor 1220 may be referred to as a CP.

The memory 1230 may store programs and data necessary for operations of the UE 1200. Also, the memory 1230 may store control information or data which are included in a signal obtained by the UE 1200. Also, the memory 1230 may store the predefined operation rule used by the UE 1200. The memory 1230 may be implemented as a storage medium including a ROM, a RAM, a hard disk, a CD-ROM, a DVD, or the like, or any combination thereof. Alternatively, the memory 1230 may not be separately arranged but may be included in the processor 1220. The memory 1230 may be configured as a volatile memory, a non-volatile memory, or a combination of a volatile memory and a non-volatile memory. The memory 1230 may provide stored data, in response to a request by the processor 1220.

A transmitter and a receiver may be collectively referred to as the transceiver 1210, and the transceiver 1210 of the UE 1200 may transmit or receive a signal to or from a BS (e.g., an IAB node) or a network entity. The transmitted or received signal may include control information and data. To this end, the transceiver 1210 may include a RF transmitter for up-converting and amplifying a frequency of signals to be transmitted, and an RF receiver for low-noise-amplifying and down-converting a frequency of received signals. However, this is merely an example of the transceiver 1210, and thus elements of the transceiver 1210 are not limited to the RF transmitter and the RF receiver. Also, the transceiver 1210 may receive signals via wireless channels and output the signals to the processor 1220, and may transmit signals output from the processor 1220, via wireless channels.

An embodiment of the present disclosure may be embodied as a computer-readable recording medium, e.g., a program module to be executed in computers, which includes computer-readable instructions. The computer-readable recording medium may include any usable medium that may be accessed by computers, volatile and non-volatile medium, and detachable and non-detachable medium. Also, the computer-readable recording medium may include a computer storage medium. The computer storage medium includes all volatile and non-volatile media, and detachable and non-detachable media which are technically implemented to store information including computer-readable instructions, data structures, program modules or other data.

The disclosed embodiments may be implemented in a software (S/W) program including instructions stored in a computer-readable storage medium.

The computer is a device capable of calling the stored instructions from the storage medium and operating according to the disclosed embodiments in accordance with the called instructions, and may include an electronic device according to the disclosed embodiments.

The computer-readable storage medium may be provided in the form of a non-transitory storage medium. Here, the term 'non-transitory' means that the storage medium is tangible and does not refer to a transitory electrical signal, but does not distinguish that data is stored semi-permanently or temporarily on the storage medium.

Furthermore, a control method according to the disclosed embodiments may be provided in a computer program product. The computer program product may be traded between a seller and a purchaser as a commodity.

The computer program product may include an S/W program and a computer-readable storage medium having stored thereon the S/W program. For example, the computer program product may include a product (e.g. a downloadable application) in an S/W program distributed electronically through a manufacturer of an electronic device or an electronic market (e.g., Google Play Store and App Store). For electronic distribution, at least a part of the S/W program may be stored on the storage medium or may be generated temporarily. In this case, the storage medium may be a storage medium of a server of the manufacturer, a server of the electronic market, or a relay server for temporarily storing the S/W program.

The computer program product may include a storage medium of a server or a storage medium of a device, in a system including the server and the device. Alternatively, when there is a third device (e.g., a smartphone) that communicates with the server or the device, the computer program product may include a storage medium of the third device. Alternatively, the computer program product may include an S/W program that is transmitted from the server to the device or the third device or from the third device to the device.

In this case, one of the server, the device, and the third device may perform the method according to the embodiments of the disclosure by executing the computer program product. Alternatively, at least two of the server, the device, and the third device may divide and perform, by executing the computer program product, the method according to the disclosed embodiments.

For example, the server (e.g., a cloud server, an AI server, or the like) may execute the computer program product stored in the server, thereby controlling the device to perform the method according to the disclosed embodiments, the device communicating with the server.

As another example, the third device may execute the computer program product, thereby controlling the device to perform the method according to the disclosed embodiments, the device communicating with the third device. When the third device executes the computer program product, the third device may download the computer program product from the server, and may execute the downloaded computer program product. Alternatively, the third device may perform the method according to the disclosed embodiments by executing a pre-loaded computer program product.

Throughout the specification, the term "unit" may indicate a hardware component such as a processor or a circuit, and/or may indicate a software component that is executed by a hardware configuration such as a processor.

While the present disclosure has been particularly shown and described with reference to the accompanying drawings, in which embodiments of the present disclosure are shown, it is obvious to one of ordinary skill in the art that the present disclosure may be easily embodied in many different forms without changing the technical concept or essential features of the present disclosure. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

The scope of the present disclosure is defined by the appended claims, rather than defined by the aforementioned detailed descriptions, and all differences and modifications that can be derived from the meanings and scope of the claims and other equivalent embodiments therefrom will be construed as being included in the present disclosure.

The invention claimed is:

1. A method, performed by a first gNodeB (gNB)-central unit (CU), of supporting an integrated access and backhaul (IAB) node in performing handover to a second gNB-CU in a wireless communication system, the method comprising:

transmitting handover information to at least one lower node connected to the IAB node, the handover information being determined based on a measurement report for handover of the IAB node;

transmitting a handover request message comprising the handover information of the IAB node to the second gNB-CU;

receiving context information from the at least one lower node;

based on the context information, identifying, as a first class, a lower node to perform intra-CU handover, and identifying, as a second class, a lower node to perform inter-CU handover from among the at least one lower node;

supporting intra-CU handover of the lower node identified as the first class; and supporting inter-CU handover of the IAB node to the second gNB-CU, based on the handover information of the IAB node and a handover acceptance message of the IAB node which is received from the second gNB-CU.

2. The method of claim 1, wherein the context information of the lower node is received as a response to the handover information of the IAB node being transmitted to the lower node, or is received when a channel state of the lower node is changed.

3. The method of claim 1, wherein the lower node identified as the second class maintains connection to the IAB node while the IAB node performs inter-CU handover to the second gNB-CU.

4. The method of claim 1, further comprising:

setting a timer for the lower node identified as the second class, wherein the lower node identified as the second class maintains connection to the IAB node until the set timer expires.

5. The method of claim 4, wherein the handover information comprises information about a handover time of the IAB node, and a start time of the timer is determined based on the handover time.

6. A method, performed by a second gNodeB (gNB)-central unit (CU), of supporting an integrated access and backhaul (IAB) node in performing handover from a first gNB-CU in a wireless communication system, the method comprising:

receiving, from the first gNB-CU, a handover request message comprising handover information determined based on a measurement report for handover of the IAB node;

transmitting a handover acceptance message of the IAB node to the first gNB-CU, in response to the handover request message;

supporting the IAB node in performing inter-CU handover from the first gNB-CU;

performing a radio resource control (RRC) connection re-establishment procedure on the IAB node, and performing an RRC connection re-establishment procedure on at least one lower node connected to the IAB node;

identifying, from among the at least one lower node of the IAB node, a lower node as a third class, the lower node not having received control signal for RRC connection re-establishment until expiry of a timer preset for the lower node; and supporting intra-CU handover of the lower node identified as the third class.

7. The method of claim 6, further comprising:

transmitting, via the IAB node, a control signal for intra-CU handover to the lower node identified as the third class.

8. The method of claim 6, further comprising:

receiving context information from the at least one lower node connected to the IAB node; and identifying, based on the context information, as the third class, a lower node to perform intra-CU handover from among the at least one lower node.

9. A method of performing, by an integrated access and backhaul (IAB) node, handover from a first gNodeB (gNB)-central unit (CU) to a second gNB-CU in a wireless communication system, the method comprising:

transmitting a measurement report for handover to the first gNB-CU;

identifying, as a first class, a lower node to perform intra-CU handover, and identifying, as a second class, at least one lower node to perform inter-CU handover from among at least one connected lower node;

supporting intra-CU handover of the lower node identified as the first class;

receiving a handover acceptance message from the second gNB-CU via the first gNB-CU; and performing, based on the handover acceptance message, handover from the first gNB-CU to the second gNB-CU.

10. The method of claim 9, further comprising maintaining connection with the at least one lower node identified as the second class while performing handover from the first gNB-CU to the second gNB-CU.

11. The method of claim 9, further comprising:

identifying, from among the at least one lower node identified as the second class, a lower node as a third class, the lower node not having received a control signal for radio resource control (RRC) connection re-establishment until expiry of a timer preset for the lower node; and supporting intra-CU handover of the lower node identified as the third class.

12. The method of claim 11, further comprising:

transmitting and receiving control signals for intra-CU handover to and from the lower node identified as the third class.

13. The method of claim 9, further comprising:

receiving context information from the at least one lower node identified as the second class;

identifying, based on the context information, as a third class, a lower node to perform intra-CU handover from among the at least one lower node identified as the second class; and supporting intra-CU handover of the lower node identified as the third class.

14. A first gNodeB (gNB)-central unit (CU) to support an integrated access and backhaul (IAB) node in performing handover to a second gNB-CU in a wireless communication system, the first gNB-CU comprising:

a transceiver; and
at least one processor connected to the transceiver,
wherein the at least one processor is configured to:
transmit handover information to at least one lower node connected to the IAB node, the handover information being determined based on a measurement report for handover of the IAB node,
transmit a handover request message comprising the handover information of the IAB node to the second gNB-CU,
receive context information from the at least one lower node,
based on the context information, identify, as a first class, a lower node to perform intra-CU handover, and identifying, as a second class, a lower node to perform inter-CU handover from among the at least one lower node,
support intra-CU handover of the lower node identified as the first class, and
support inter-CU handover of the IAB node to the second gNB-CU, based on the handover information of the IAB node and a handover acceptance message of the IAB node which is received from the second gNB-CU.

* * * * *